United States Patent
Collins et al.

(10) Patent No.: US 9,336,550 B2
(45) Date of Patent: May 10, 2016

(54) INTERACTIVE SALE GENERATION AND PURCHASE COORDINATION DIGITAL MEDIA

(71) Applicant: CS FRONTIER, LLC, Boston, MA (US)

(72) Inventors: Brandon Desormeau Collins, Boston, MA (US); Patrick James Shea, Boston, MA (US); John Joseph Collins, III, Lake George, NY (US)

(73) Assignee: CS FRONTIER, LLC, Boston, MA (US)

( * ) Notice: Subject to any disclaimer, the term of this patent is extended or adjusted under 35 U.S.C. 154(b) by 0 days.

(21) Appl. No.: 14/495,032

(22) Filed: Sep. 24, 2014

(65) Prior Publication Data

US 2016/0086257 A1 Mar. 24, 2016

(51) Int. Cl.
*G06K 15/00* (2006.01)
*G06Q 30/06* (2012.01)

(52) U.S. Cl.
CPC .................................. *G06Q 30/0641* (2013.01)

(58) Field of Classification Search
USPC ............ 235/383, 380; 705/14.23, 14.24, 14.4
See application file for complete search history.

(56) References Cited

U.S. PATENT DOCUMENTS

| | | | |
|---|---|---|---|
| 8,060,414 B1* | 11/2011 | Lin | G06Q 30/06 705/26.1 |
| 8,668,146 B1 | 3/2014 | McGhie et al. | |
| 2013/0132235 A1 | 5/2013 | Gandhi | |
| 2014/0025521 A1 | 1/2014 | Alsina et al. | |
| 2014/0129354 A1* | 5/2014 | Soon-Shiong | G06Q 30/06 705/16 |
| 2014/0279294 A1 | 9/2014 | Field-Darragh et al. | |
| 2014/0337158 A1* | 11/2014 | Kelly | G06Q 30/0643 705/26.5 |
| 2015/0081428 A1* | 3/2015 | Mare | G06Q 30/0251 705/14.49 |
| 2015/0254680 A1* | 9/2015 | Scoles | G06Q 30/0201 705/7.29 |

\* cited by examiner

*Primary Examiner* — Ahshik Kim
(74) *Attorney, Agent, or Firm* — Miller Canfield Paddock and Stone; Mark L Maki

(57) ABSTRACT

A computer implemented method and a sales management system (SMS) for generating sales through interactive digital content (IDC) integrate multiple electronic commerce service providers (ECSPs) for facilitating purchase of multiple sale items from within digital media. The SMS preferably inserts an indicator element at a predefined location within the IDC in the digital media that, when activated, invokes a display of multiple sale item indicators. When a sale item indicator is activated, the SMS retrieves sale item information associated with the sale item, and selects an ECSP for completing the purchase of the sale item. The SMS displays a dynamic interactive display element (DIDE) linked to the activated sale item indicator. The DIDE displays sale item information and provides direct purchasing options. The SMS renders a content display interface associated with the selected ECSP based on a selection of one of the purchasing options for initiating purchase of the sale item.

23 Claims, 12 Drawing Sheets

INTERACTIVE SALE GENERATION AND PURCHASE COORDINATION DIGITAL MEDIA

FIELD OF THE INVENTION

The invention relates to a computer method and system for generating purchases of sales items, and more particularly, to a method and sales management system which generates sales through interactive digital content on a consumer device.

BACKGROUND

Computers and consumer devices have become increasingly more advanced, allowing consumers to do more things, in more places, and in less time. Consumers have regularly used various consumer devices to purchase sale items on the internet and engage in electronic commerce (e-commerce). In a conventional online shopping environment, a consumer would see an advertisement for a sale item, for example through one web site, navigate or be redirected to another website offering the sale item, such as a vendor web site having various items for sale, find the sale item on that website or be directed to a particular web page relating to the sale item of interest, add the sale item to a shopping cart, confirm shipping and billing details, and then purchase the sale item through the vendor web site. This type of purchasing process requires substantial time and interaction on the part of the consumer, and as a result has a high abandonment rate. As the current advertising methods are inefficient, a relatively small percentage of digital advertisements lead to consumer purchases. Further, vendors or retailers should remain challenged to generate sales growth in a weak economic environment. In their quest for sales growth, among other things, vendors must reassess the effectiveness of their various marketing strategies.

Product placement has played a key role in advertising for decades. For example, moving images, such as a television show or a movie can potentially contain dynamic advertisements. Similarly, mediums such as digital newspapers and digital magazines are utilized for providing advertisements. For example, a digital article in an architectural magazine may show a photograph illustrating the design of a room in connection with an article about the building in which the room exists. It may not be common for such an article to include the particulars of all the sale items shown in the photograph, since the article is about the building. Certain sale items in the photograph may be labeled and can be easily referenced and found by the consumer, for example, through search engines or through vendor information shown in the graphics of the article which helps the shopper browse a vendor web site and research a sales item. However, there are hundreds of sale items advertised in digital media that do not have labels visually associated with them which make it difficult or even impossible for the average consumer to find out who made these sale items or how to purchase them.

A study by Adobe® Digital Index (ADI) of Adobe Systems Incorporated has shown that static advertising is not overly effective in generating sales whereas interactive digital advertising is substantially more effective. Interactive digital advertising allows interaction between a prospective consumer and the digital device on which the digital advertising is displayed. Some websites that offer sale items have attempted to streamline the online shopping process by providing dynamic advertisements linking the sale items contained therein to third party websites where the sale items can be researched and purchased. Such linking can be achieved via individual hyperlinks for each sale item or product in the dynamic advertisement. For example, consider an image displayed in a digital newspaper comprising multiple purchasable sale items linked to individual sites where each sale item can be purchased from. A consumer may be able to mouse over an image of a specific sale item that he/she is interested in and be directly linked to that particular sale item by clicking on the image of the sale item. Multiple hyperlinks can be provided which allow the shopper to redirect to multiple web pages or web sites. Each sales item might need to be researched one at a time. An editorial picture in an article can thus be dynamically transformed into an advertisement that provides multiple purchasable goods. This can therefore allow almost any photograph to be turned into an advertisement, and allow the photograph to convey whatever original meaning was intended.

However, a hyperlink causes the consumer to leave the primary digital media they are viewing, such as a web site on their digital device, to visit the vendor's secondary or remote website through which details on the item can be viewed and the purchase can be made. If the digital media is being viewed in a separate application, for example, a news reader, clicking on the hyperlink requires launching and switching to a browser, which can take considerable time, resources, and patience on the part of the consumer. Ultimately, the consumer may have to open multiple applications or web sites to view the primary digital media and shop for the various sales items, and when completed, then the consumer must find and return to the original digital media application to continue their activities. Therefore, such an option takes or redirects the consumer away from the original digital media they are viewing, which can deter the consumer from making the purchase or can pull the consumer away from the digital media and the associated advertisements and reduce the possibility of additional purchases. Hence, there is a need to improve the display of sale item information on a consumer device and improve the initiation of a transaction for the sale item without detracting from the original digital media.

Hence, there is a long felt but unresolved need for a computer implemented method and a sales management system that improve the display of interactive digital content within digital media on a consumer device, promote shopping and transactions for sale items without detracting from the digital media, and generate sales through the interactive digital content within the digital media.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

Generally, the invention relates to an improved method and sales management system that promotes the marketing and sale of items directly through a consumer's digital device. With the present invention, the consumer can use their digital device for normal activities that do not necessarily involve shopping for sales items, but the digital media may display various sales items within the digital media. For example, a digital article or advertising may include graphics such as photos or text that include or reference a variety of items that are available for sale. In this regard, an advertisement or article might include a picture of a model using or wearing a variety of different items from different vendors, wherein a number of these items are available for purchase. To minimize distracting the consumer from the original activity while still promoting and marketing the sales item, each sales item preferably is displayed with a sales indicator that is not obtrusive but can be activated by the consumer to prominently display additional information about the sales item. It will be understood that all items do not need a respective sales item associated therewith. Instead, a single sales item might be associated with the digital media, such as a single sales item indicator located close to a collection or group of sales items displayed in the digital media Essentially, the sales item indicator functions to draw the consumer's interest to the point that the consumer decides to activate the sales item indicator, view detailed information on the sales item, and ultimately, purchase the sales item. Preferably, the system includes a primary indicator element to toggle the individual sales item indicator(s) on or off, although the invention also may display the sales item indicator(s) continuously. The sales item indicators serve as non-obtrusive prompts that indicate to the consumer that the particular item being displayed is available for sale, and if their interest is piqued, the consumer can quickly and directly display information on the sales item while still being able to quickly and conveniently return to their original activity once their interest wanes or more preferably, once a purchase is completed. This system and the additional features disclosed herein represent an improved method and system for promoting and marketing sales items.

More particularly, the computer implemented method and sales management system disclosed herein address the above stated needs for improving the display of interactive digital content within digital media on a consumer device by providing several features so that a consumer can readily identify sales items and if interested, easily research multiple sales items while remaining within the display area of the digital device. By consolidating the shopping experience within the digital media display area, the invention is more likely to initiate transactions for sale items without detracting from the digital media, and generate sales through use of the interactive digital content directly within the original digital media being reviewed. The computer implemented method disclosed herein employs the sales management system of the present invention, which system comprises at least one processor configured to execute computer program instructions to improve the format and function of the digital media being used by a potential purchaser. The digital media is significantly improved for generating sales through the interactive digital content contained within digital media on the consumer device. The sales management system displays the digital media comprising the interactive digital content on the consumer device via a graphical user interface (GUI) used with the sales management system.

The computer implemented method disclosed herein dynamically integrates one or more electronic commerce service providers, who offer various sale items to a consumer for purchase from a variety of vendors. Ultimately, the sales management system facilitates the viewing of multiple sale items directly from within the digital media without redirecting the consumer to separate web pages or web sites operated by the electronic commerce service provider until the purchasing step when the decision to purchase has been made. The interactive digital content promotes sale items that are available for purchase from within the digital media displayed on the consumer device and the consumer may select any of these items for purchase from an electronic commerce service provider. Additionally, each sale item may be mapped to one or more related sale items provided by the electronic commerce service provider to promote secondary purchases of related sales items.

To help identify the sales items contained within the digital media, the sales management system preferably inserts an indicator element at a predefined location within the interactive digital content in the digital media. The indicator element is displayed on the consumer device and visible to the consumer who may selectively activate the indicator element to toggle on and display multiple sale item indicators associated with respective sale items viewable within the digital media. When the indicator element is activated, the sales management system displays each of the sale item indicators positioned proximal or close to a respective one of the sale items wherein the sales items can be seen within the interactive digital content in the digital media on the consumer device via the GUI. While a user may start by viewing an article or advertisement, activation of the main indicator element then shows the user what visible articles are actually sales items available for purchase. When the various sales item indicators are toggled on or otherwise visible, each sale item indicator is associated with one or more sale items to indicate and show what sales items are available for purchase from within the interactive digital content in the digital media on the consumer device. If the consumer is interested, the consumer in turn may activate or select one of the sale item indicators associated with one or more of the sale items through interaction with the interactive digital content. Upon activation, the sales management system retrieves sale item information associated with that sale item and selects one of the electronic commerce service providers, which supplies the information necessary for completing the purchase of the sale item if the consumer decides to make such a purchase.

When the sale item indicator is activated by the consumer, the sales management system displays a dynamic interactive display element linked to the activated sale item indicator wherein the interactive display element is displayed directly within the digital media on the consumer device. There is no linking or redirection to another web site to review this information and make a purchasing decision. Rather, the dynamic interactive display element displays the retrieved sale item information and provides purchasing options for facilitating purchase of the sale item. The consumer can select one or more of the purchasing options. At this stage, the sales management system renders a content display interface, for example, a web page of a website associated with the selected electronic commerce service provider, although the content display interface is rendered within the dynamic interactive display element based on the selection of one or more of the purchasing options. The content display interface is provided for initiating purchase of the sale item from within the dynamic interactive display element and thereby generating sales through the interactive digital content within the digital media.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. Also, various structural elements may be employed depending on design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1A:
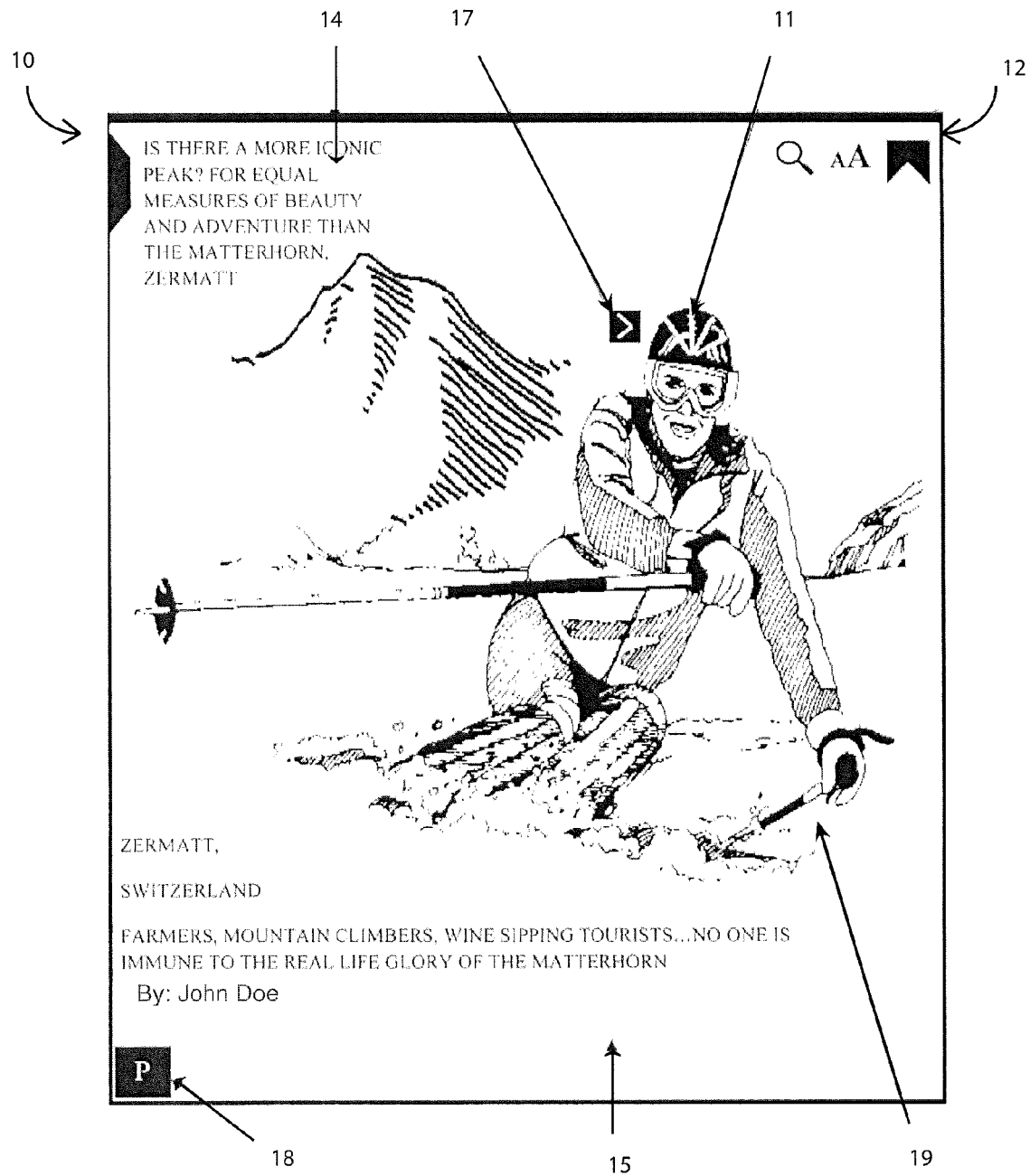
FIG. 1A exemplarily illustrates a screenshot of a graphical user interface or display screen of a digital device being used by a consumer to view digital media, wherein the digital media is displayed by a sales management system of the present invention so as to include an indicator element and an exemplary sales item indicator.

For a general understanding of the present invention, FIGS. 1A-1D comprise exemplary screenshots showing the method and system of the present invention. In this regard, the invention relates to an improved method and sales management system 10 that promotes the marketing and sale of items 11 directly through a consumer's digital device 12. FIG. 1A shows the digital device 12 with a graphical user interface (GUI) 14 such as a display screen which illustrates digital media 15 that can be displayed in many different forms as described in more detail herein. With the present invention, a consumer can use their digital device 12 for normal activities that do not necessarily involve shopping for sales items 11 such as surfing web pages or reading digital articles, blogs, catalogs and the like. While using the digital device 12 for these normal activities, the digital media 15 may display various sales items 11 within the digital media 15. For example, a digital article or advertising may include graphics such as photos that include a variety of items 11 that are available for sale. The digital article may also include text that references sale items 11. FIG. 1A shows a screenshot from a digital article that includes a picture of a model using or wearing a variety of different items, which can be supplied from different vendors, wherein the item 11 is available for purchase. In this example, the item 11 is a helmet. To minimize distracting the consumer from the original activity while still promoting and marketing the sales item 11, the sales item 11 is displayed with a sales item indicator 17 that is not obtrusive but can be activated by the consumer to display additional information about the sales item 11. Therefore, the sales item indicator 17 functions to catch the consumer's interest to the point that the consumer decides to activate the sales indicator 17, view detailed information on the sales item 11, and ultimately, purchase the sales item 11. Preferably, the system 10 includes a primary indicator element 18 to toggle the individual sales indicator(s) 17 on or off, although the invention also may display the sales indicator(s) 17 continuously. Each sales indicator 17 serves as a non-obtrusive prompt that indicates or signals to the consumer that the particular item 11 being displayed is available for sale, and if their interest is piqued, the consumer can quickly and directly display information on the sales item 11 while still being able to quickly and conveniently return to their original activity in the digital media 12 once their interest wanes or more preferably, once a purchase is completed. This system 10 and the additional features disclosed herein represent an improved method and system for promoting and marketing sales items.

Figure 1B:
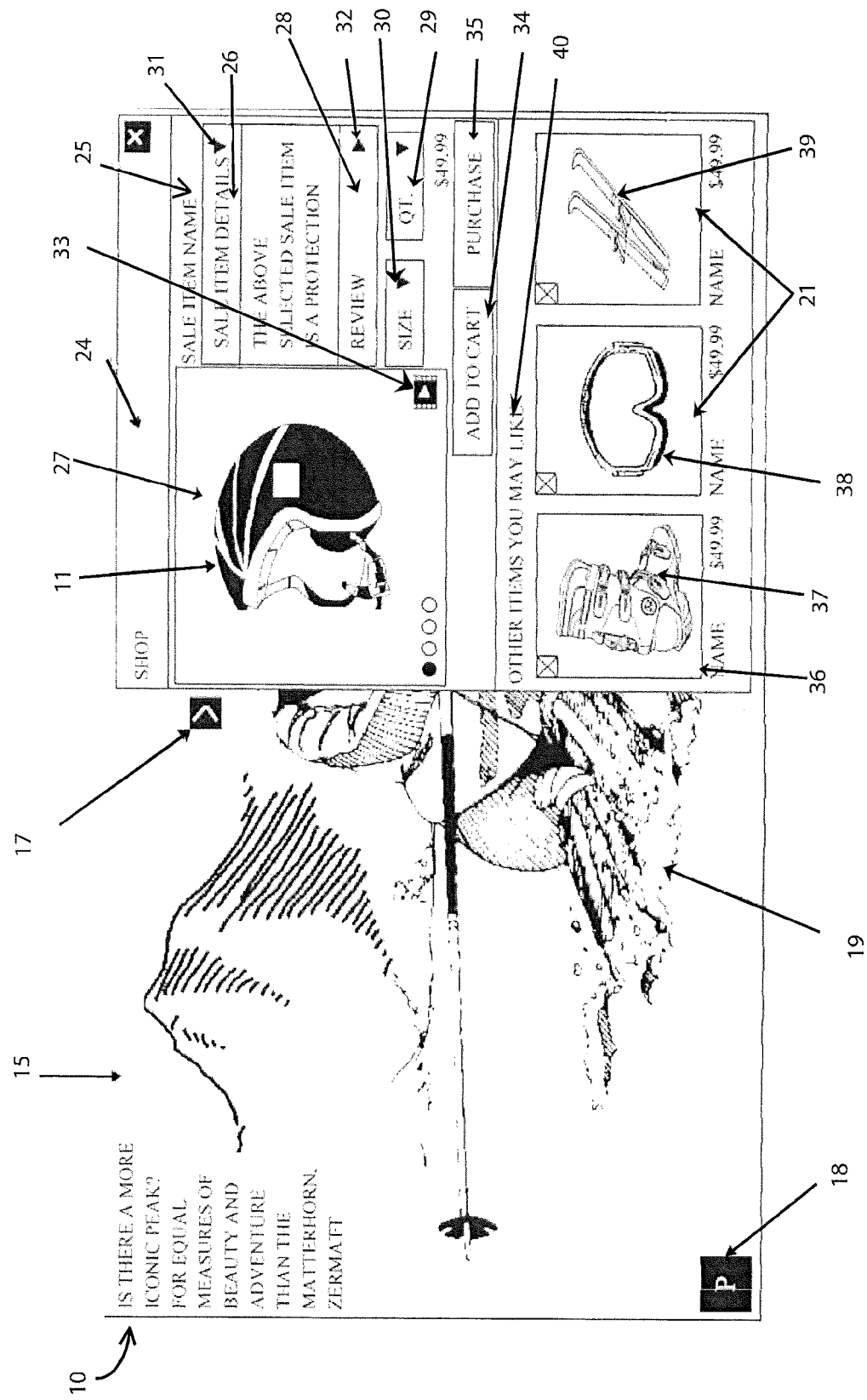
FIG. 1B illustrates an exemplary screenshot wherein the digital media is displayed with a dynamic interactive digital element in the form of a dynamic lightbox displaying sales item information.

In more detail, FIGS. 1A-1D illustrate exemplary screenshots of the GUI 14 provided by the sales management system 10 exemplarily illustrated in following FIGS. 2-9, for generating sales through interactive digital content 19 within the digital media 15. FIG. 1A exemplarily illustrates a screenshot of the GUI 14 displaying digital media 15, for example, a digital magazine which includes a digital article on skiing. The digital media 15 comprises interactive digital content 19, which includes one or more sale items 11. For example, FIG. 1A shows a digital article showing a digital image of a skier wearing the sale item 11 such as a helmet 11 in this example. It will be understood that these exemplary screenshots could include a variety of different sales items 11 such as the gloves, ski poles, skis, boots, etc. The sales management system 10 disclosed herein enhances sales success of digital magazine advertisements by facilitating purchase of the sale item 11 directly from within the digital magazine itself. The sales management system 10 may display various sale items 11 in a particular presentation of the interactive digital content 19, which thereby provides vendors with an innovative vehicle to not only showcase a variety of primary sales items 11 displayed in the specific digital media advertisements as seen in FIG. 1A, but also showcase additional related sale items 21 as seen in FIG. 1B, which vendors believe are appropriate.

Referring to FIGS. 1A and 1B, the sales management system 10 preferably embeds the indicator element 18 at any predefined location in the GUI 14 to allow the consumer to toggle the sales items indicator(s) 17 on and off. For example, the indicator element 18 is displayed as a "P" icon, in the digital article which on activation by the consumer invokes the display of a respective sale item indicator 17 positioned proximal to the helmet 11. If there are multiple sale items 17 on display, a respective number of sale item indicators 17 preferably are displayed when the indicator element 18 is activated. When a consumer clicks on the "P" icon 18 with a mouse, touchscreen, touchpad or the like, the system 10 displays the sale item indicator 17 next to the helmet 11 which indicates to the consumer that the helmet 11 is purchasable through the interactive digital content 19. While one sales item indicator 17 is preferably associated with a single sales item 11, a single sale item indicator 17 also might be associated with a group or collection of sales items 11 being displayed.

As illustrated in FIG. 1B, when the consumer clicks on a selected sale item indicator 17, the system 10 retrieves related sale items 21 and sale item details associated with the sale item 11 using a sale item identifier of the sale item 11, the vendor identifier of the vendor who is selling the sale item 11, and the vendor configuration settings configured by the vendor in accord with the disclosure herein. The system 10 coordinates with any number of electronic commerce service providers 23 (FIG. 2) who offer the various sales items 11 for sale through the interactive digital content 19. As used herein, "electronic commerce service provider" 23 refers to an entity, for example, Amazon® of Amazon Technologies, Inc., eBay® of eBay, Inc., etc., that facilitates interactive electronic commerce transactions between buyers and sellers. Generally, the system 10 determines an electronic commerce service provider 23, for example, Amazon® for completing the purchase of the sale item 11 based on the retrieved vendor configuration settings, the retrieved sale item identifier, and the retrieved vendor identifier. The sales item detail will either be obtained from server-based storage or from the electronic commerce service provider 23. The system 10 further retrieves inventory information comprising, for example, the size and quantity values from the Amazon® database.

More particularly as to the example seen in FIG. 1B, when the sales item indicator 17 is clicked or otherwise activated, a dynamic interactive digital element 24 is displayed on the GUI 14. The dynamic interactive digital element 24, for example, preferably is displayed in the form of a dynamic lightbox 24 that displays the retrieved sale item information. The dynamic lightbox 24 lists the sale item information about the sale item 11, for example, the name 25 of the sale item 11, brief details 26 about the sale item 11, high resolution images 27 of the sale item 11, reviews 28, quantity or number of units available 29, and a size button 30 to show available sizes. The dynamic lightbox 24 provides a sale item details button 31, a sale item review button 32, a video button 33, an "add to" cart button 34, and a purchase button 35. The sale item details button 31 when clicked or otherwise selected displays a pop up window showing a description about the sale item 11. The sale item review button 32 when clicked displays a pop up window showing reviews written by other consumers who have purchased the sale item 11. The video button 33 when clicked displays a pop up window showing a video of the sale item 11. The "add to" cart button 34 when clicked adds the sale item 11 to the shopping cart. The purchase button when clicked redirects to the determined electronic commerce service provider 23, that is, Amazon® in the exemplary scenario. When the consumer clicks on the image of the sale item 11, the system 10 displays an enlarged image 27 of the sale item 11. The size dropdown option includes the size button 30 that displays a dropdown list of available sizes when clicked wherein the individual sizes can be selected to allow the consumer to select a particular size of the sale item 11 that the consumer requires.

Also, when the sales item indicator 17 is activated, the system 10 not only displays the primary sales item 11, such as the helmet, but also shows related sales items 21 which have some nexus or relationship to the sales item 11. The relationship could be determined by the system 10 itself or preferably by agreement with the vendors. In the lightbox 24, the lightbox 24 includes related sales item boxes 36 for all of the related sale items 21, for example, skiing boots 37, goggles 38, skis 39, etc., which are displayed at the bottom of the dynamic lightbox 24 as thumbnails within the related sales item boxes 36. The dynamic lightbox 24 displays more related sale items 21 when the consumer performs a left swipe motion or a right swipe motion in the related sale items section. When the consumer clicks on one of the related sale items 21 displayed in the boxes 36 in the related sale items section 40, the system 10 provides detailed information about the selected related sale item 21 in lightbox 24.

Figure 1C:
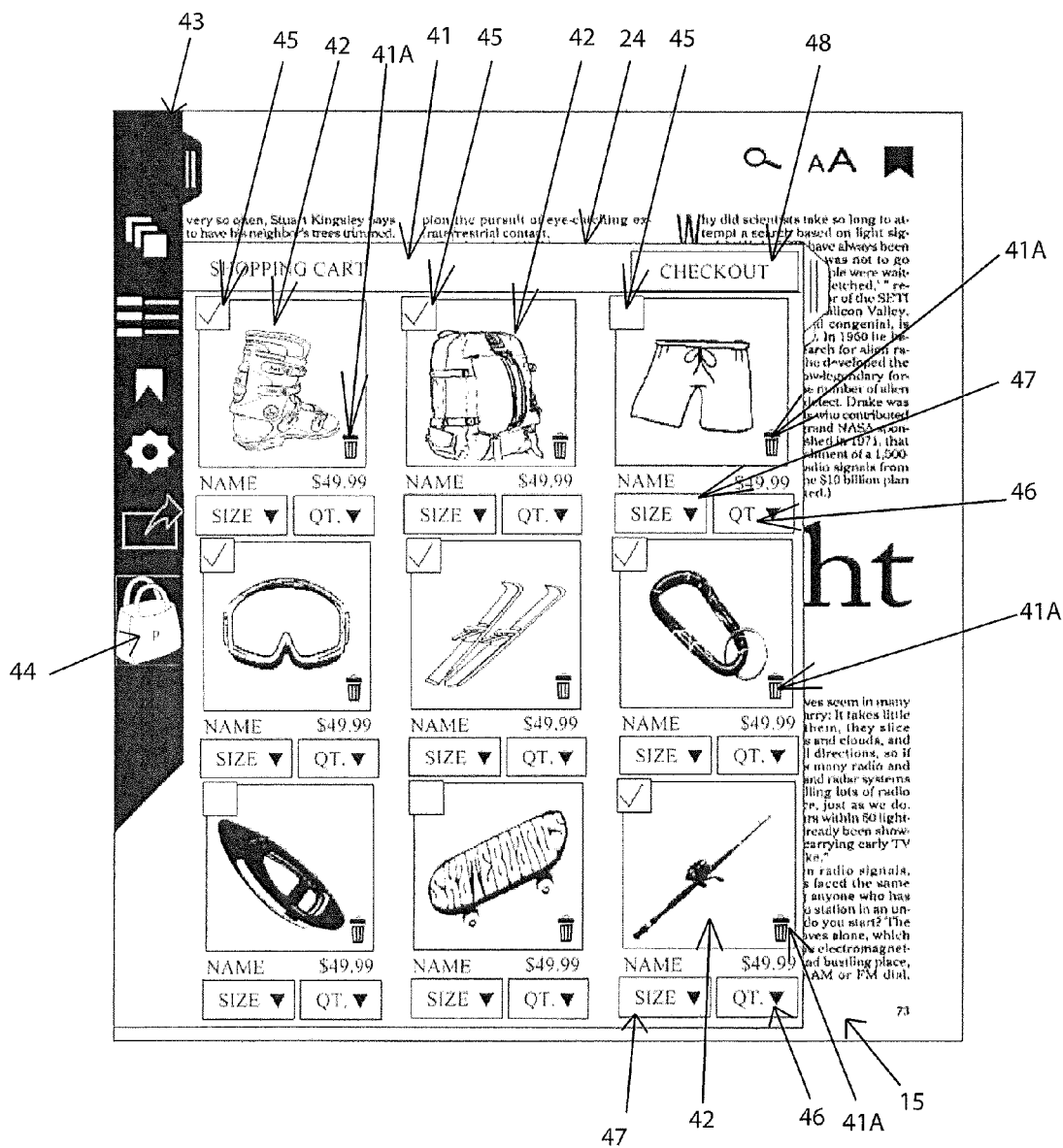
FIG. 1C illustrates a next exemplary screenshot wherein the digital media is displayed with a shopping cart.

If the consumer clicks on the add to cart button 34, then the helmet 11 is added to the shopping cart 41 as seen in FIG. 1C. All the other sale items 11 that the consumer wants to purchase are also added to the shopping cart 41 and displayed as selected sales items 42. A toolbar 43 is included to provide shortcut links to frequently used controls, for example, a settings menu, the shopping cart 41, etc. When the consumer clicks on the shopping cart icon or shopping bag icon 44 on the toolbar 43, the shopping cart 41 is displayed within the dynamic interactive digital element or dynamic lightbox 24 showing all the sale items 11 or related sales items 21 that the consumer has added to the shopping cart 41 as selected sales items 42 as exemplarily illustrated in FIG. 1C. If the consumer decides to proceed and purchase the helmet 11 by clicking on the final purchase button 35, the consumer is then routed to an electronic commerce service provider 23 such as Amazon® as exemplarily illustrated in FIG. 1D.

Preferably as seen in FIG. 1C, the shopping cart 41 displays the sale items 42 in a table format comprising rows and columns. For example, the shopping cart 41 exemplarily illustrated in FIG. 1C shows the $5^{th}$ computer code view comprising 3 items on vertical view and 3 items on horizontal view listed in each row wherein the consumer can scroll top and bottom or side to side if there are more selected items 42 than would fit in the lightbox 24, that is, when there are many selected sale items 42 in the shopping cart 41. The system 10 allows the consumer to edit size and quantity of each selected sale item 42 in the shopping cart 41 and select one or more sale items 42 for immediate purchase. As a default option, all the selected sale items 42 in the shopping cart 41 will be selected, that is, the item checkbox 45 next to the sale item 42 is checked and the consumer can uncheck the checkbox 45 to avoid purchasing that particular sale item 42 from the shopping cart 41 at the time of purchase. However, the unchecked sales item 42 can remain in the shopping cart 41, which essentially serves as a wishlist of sales items 42. The consumer can change quantity 46 and size 47 before checkout. At least one size 47 and one quantity 46 of the sale item 11 should be selected by the consumer. The system 10 automatically updates the shopping cart 41 based on the consumer selections of the sale items 11, the quantity option, and the size option. If the consumer wishes to delete a selected sales item 42 from the shopping cart 41, a delete button 41A is provided near each sales item 42, which button 41A can be activated to delete the unwanted sales item 42 from the shopping cart 41. The shopping cart 41 provides an option to save the changes and close the shopping cart window by displaying an "X" icon in a corner of the shopping cart window within the dynamic lightbox 24. The shopping cart 41 also provides a checkout button 48 in the top corner of the window that allows the consumer to check out the selected sale items 42 that have box 45 checked, and at this time, redirects the consumer to the electronic commerce service provider 23 such as the Amazon® website as exemplarily illustrated in FIG. 1D. The Amazon® website 49 is loaded in the dynamic lightbox 24 within the digital magazine and the consumer can continue the purchase through the Amazon® website or other electronic commerce service provider 23.

Accordingly, with the present invention, a consumer can use their digital device 12 for normal activities that do not necessarily involve shopping for sales items 11 such as surfing web pages or reading digital articles, blogs, catalogs and the like. While using the digital device 12 for these normal activities, the digital media 15 may display the various sales items 11 within the digital media 15 and provide the indicator element 18 to toggle on the individual sales item indicator(s) 17. If the consumer is interested in any particular sales items 11, the consumer can quickly and readily research the sales items 11 directly from the interactive digital content 19 without being directed away from their primary activity on the digital device 12. The consumer can even reach the point of filling a shopping cart 41, selecting quantity 46 and size 47, and clicking the checkout button 48 before being redirected to the electronic commerce service provider 49 to complete the final purchase. At any time, the consumer may decide not to purchase any item, and will be quickly returned to their primary activity on the digital device 12 by closing out the interactive digital element, such as the lightbox 24. By minimizing the diversion and complexity of the shopping and purchasing process, the consumer may be more likely to complete quick and simple purchases, and then return to their original activity such as reading an article in a digital magazine.

Figure 2:
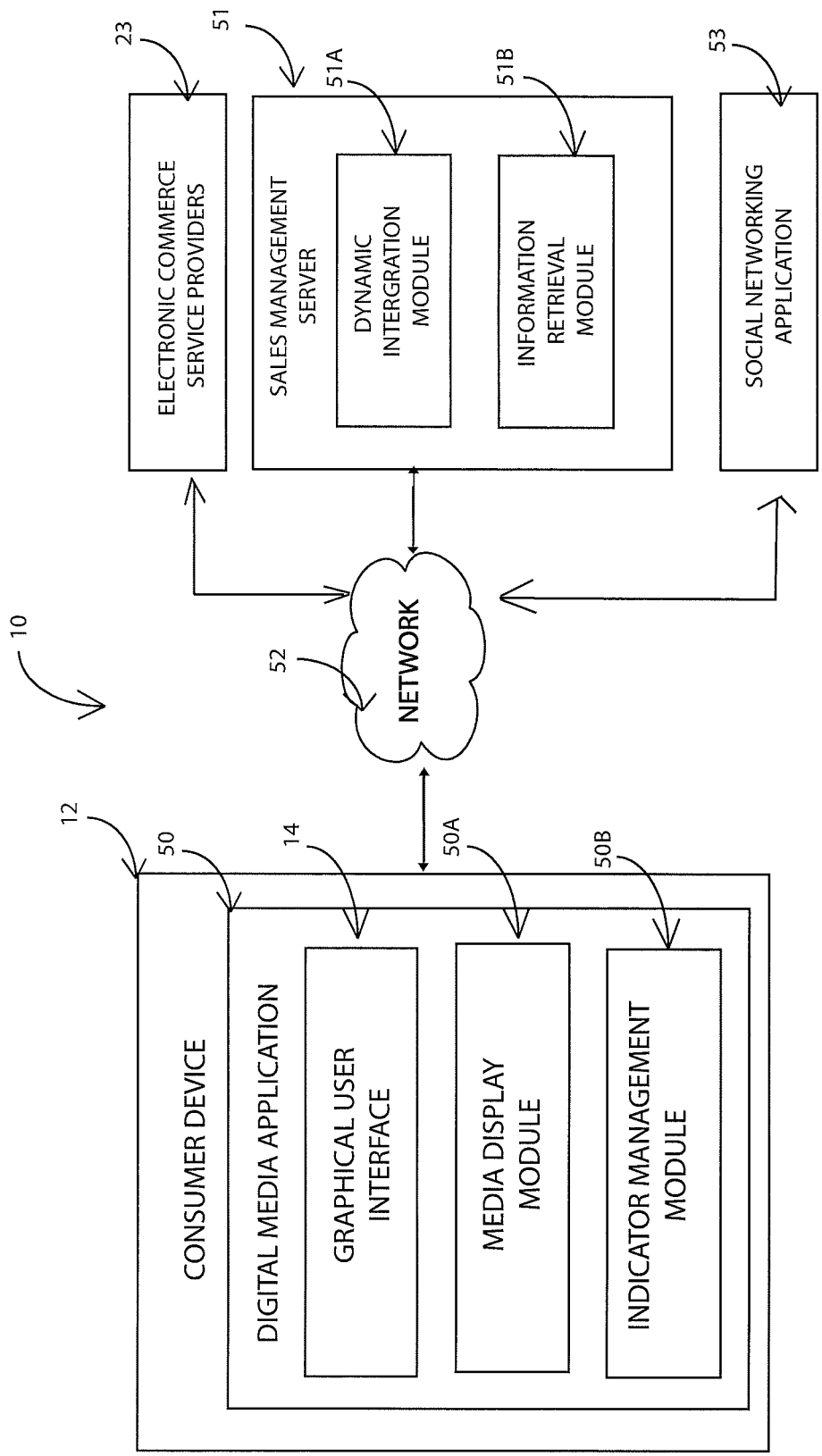
FIG. 2 illustrates a sales management system for generating sales through interactive digital content within digital media.

The following provides a more detailed discussion of the invention and how it implements the above-described method and system features. FIG. 2 illustrates the computer implemented method for generating sales through the interactive digital content 19 provided within digital media 15. As used herein, "digital media" refers to a form of electronic media comprising digitized content that can be transmitted over computer networks or the internet. The digital media 15 comprises, for example, digital magazines, digital articles, digital newspapers, digital videos, digital images, electronic books, video games, etc. Also, as used herein, "interactive digital content" refers to marketing communication data, for example, an advertisement in a digital format that is utilized by vendors to convey a message that encourages, persuades, or prompts consumers to perform an action, for example, purchase sale items 11. The interactive digital content 19 comprises, for example, digital advertisements with interactive graphics which are provided as part of the digital media 15. Also, as used herein, "sale item" refers to a commodity, for example, information, a product, a service, etc. In one example in which the present invention is used, the digital media 15 might be a digital magazine having a digital article which contains an advertisement displaying the sale items 11 available for sale.

The computer implemented method disclosed herein relates to such digital media 15, and more particularly to product cataloging and product indications used in digital advertising wherein the method promotes purchasing of products by consumers through the interactive digital content 19 provided within the digital media 15. The computer implemented method disclosed herein employs a sales management system generally designated by reference numeral 10 in FIG. 2. The sales management system 10 comprises at least one processor configured to execute computer program instructions for generating sales of sale items 11 through the interactive digital content 19 within the digital media 15 as will be described in further detail herein relative to FIGS. 3-9.

Referring to FIG. 2, the sales management system 10 comprises a digital media application 50 (FIG. 3) that provides robust features which display advertised sales items 11 and related sale items 21 as selected by vendors in a consumer friendly configuration wherein consumers can readily view the sale items 11 and related sale items 21 to facilitate the purchase thereof. As used herein, the term "consumer" refers to a buyer, for example, a customer, an individual, an organization, etc., that wants to purchase a sale item 11 from an electronic commerce service provider 23. Also, as used herein, the term "vendor" refers to a seller, for example, an individual dealer, a retailer, an outlet, a company, a supplier, etc., that offers various sale items for sale to one or more consumers via the interactive digital content 19 within the digital media 15 of the present invention. The digital media application 50 allows consumers to purchase advertised sale items 11 without leaving the digital platform on which the interactive digital content 19 is being viewed. This avoids the necessity of linking the interactive digital content 19 to third party web sites and redirecting purchasers to the third party web sites when they are still considering whether to purchase a sales item 11 or related sales item 21. The digital media application 50 presents the sale items 11 and related sale items 21 in a controlled messaging environment directly through the interactive digital media 19, which offers a streamlined cart and/or purchasing process. The direct connections provided by the digital media application 50, enable consumers to visit the electronic commerce service provider 23, view various sale items 11, and complete multiple purchases while remaining on the digital media application 50. The sales management system 10 of the present invention enables vendors to realize meaningful, immediate increased sales activity that substantially improves the return on their advertising expenditure.

In more detail, FIG. 2 illustrates the sales management system 10 for generating sales through the interactive digital content 19 within the digital media 15. The sales management system 10 disclosed herein is configured to enhance product familiarity and sales through use of interactive digital content 19, for example, digital advertisements within the digital media 15 on the consumer's digital device 12. Multiple sale items 11, for example, products or services are showcased through a single dynamic interactive display element 24, for example, the dynamic lightbox which provides both in-depth information and purchasing options for the advertised sale item(s) 11. The sales management system 10 disclosed herein provides a unique service that allows vendors or advertisers to guide consumers to several points of product purchase rather than having to rely on one single static advertisement.

The sales management system 10 comprises the digital media application 50 and a sales management server 51. The digital media application 50 is executable by at least one processor and is configured as a software application downloadable on a consumer device 12 via a network 52. The network 52 is, for example, the internet, an intranet, a wired network, a wireless network, a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, a public telephone network, etc., a local area network, a wide area network, an internet connection network, an infrared communication network, etc., or a network formed from any combination of these networks.

The digital media application 50 communicates with the sales management server 51 via the network 52. The processor is communicatively coupled to a non-transitory computer readable storage medium. The non-transitory computer readable storage medium stores computer program instructions defined by modules 50a, 50b, etc., of the digital media application 50. The processor is configured to execute the defined computer program instructions. As used herein, the phrase "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The digital media application 50 comprises a graphical user interface (GUI) 14 such as that described above; a media display module 50a, and an indicator management module 50b, which are implemented in device code on the server side. The sales management server 51 comprises a dynamic integration module 51a and an information retrieval module 51b.

The dynamic integration module 51a of the sales management server 51 dynamically integrates one or more of multiple electronic commerce service providers 23 within the sales management system 10 for facilitating purchase of multiple sale items 11 or related sale item 21 from within the digital media 15. In an embodiment, the dynamic integration module 51a further integrates multiple social networking applications 53 to promote the sale items. The media display module 50a of the digital media application 50 displays the digital media 15 comprising the interactive digital content 19 on the consumer device 12 via the GUI 14. The GUI 14 comprises an interactive interface, for example, a webpage of a website hosted by the sales management system 10, an online web interface, a web based downloadable application interface, a mobile based downloadable application interface, etc. The indicator management module 50b of the digital media application 50 preferably inserts an indicator element 18 at a predefined location within the interactive digital content 19 in the digital media 15 as disclosed in more detail relative to FIG. 1A. The indicator management module 50b further displays one or more sale item indicators 17 positioned proximal to the sale items 11 within the interactive digital content 19 in the digital media 15 on the consumer device 12 via the GUI 14 when the indicator element is activated as exemplarily discussed above relative to FIGS. 1A-1B.

The information retrieval module 51b of the sales management server 51 retrieves sale item information associated with one of the sale items 11, and selects one of the electronic commerce service providers 23 for completing purchase of the sale item 11, when one of the sale item indicators 17 associated with the sale item 11 is activated within the interactive digital content 19 in the digital media 15 via the GUI 14. The information retrieval module 51b retrieves the sale item information associated with the sale item 11, and selects the electronic commerce service provider 23 by performing multiple actions, for example, the information retrieval module 51b first retrieves a sale item identifier of the sale item, a vendor identifier, and vendor configuration settings. The information retrieval module 51b then determines one of the electronic commerce service providers 23 for completing the purchase of the sale item based on the retrieved vendor configuration settings, the retrieved sale item identifier, and the retrieved vendor identifier. The information retrieval module 51b retrieves related sale items 21 exemplarily illustrated in FIG. 1B, and sale item details associated with the sale item 11 and sale item information associated with the related sale item 21 based on the retrieved sale item identifier. The information retrieval module 51b further retrieves inventory information related to the sale item 11 from the determined electronic commerce service provider 23.

The media display module 50a displays the dynamic interactive display element 24 linked to the activated sale item indicator 17 within the digital media 15 on the consumer device 12 via the GUI 14. The media display module 50a further renders a content display interface associated with the selected electronic commerce service provider 23 within the dynamic interactive display element 24 based on a selection of one of the direct purchasing options for initiating purchase of the sale item 11 from within the dynamic interactive display element 24 and thereby generating sales through the interactive digital content 19 within the digital media 15. In an embodiment, the information retrieval module 51b further logs and validates a consumer request for viewing the sale item information prior to rendering the sale item information within the dynamic interactive display element 24.

Figure 3:
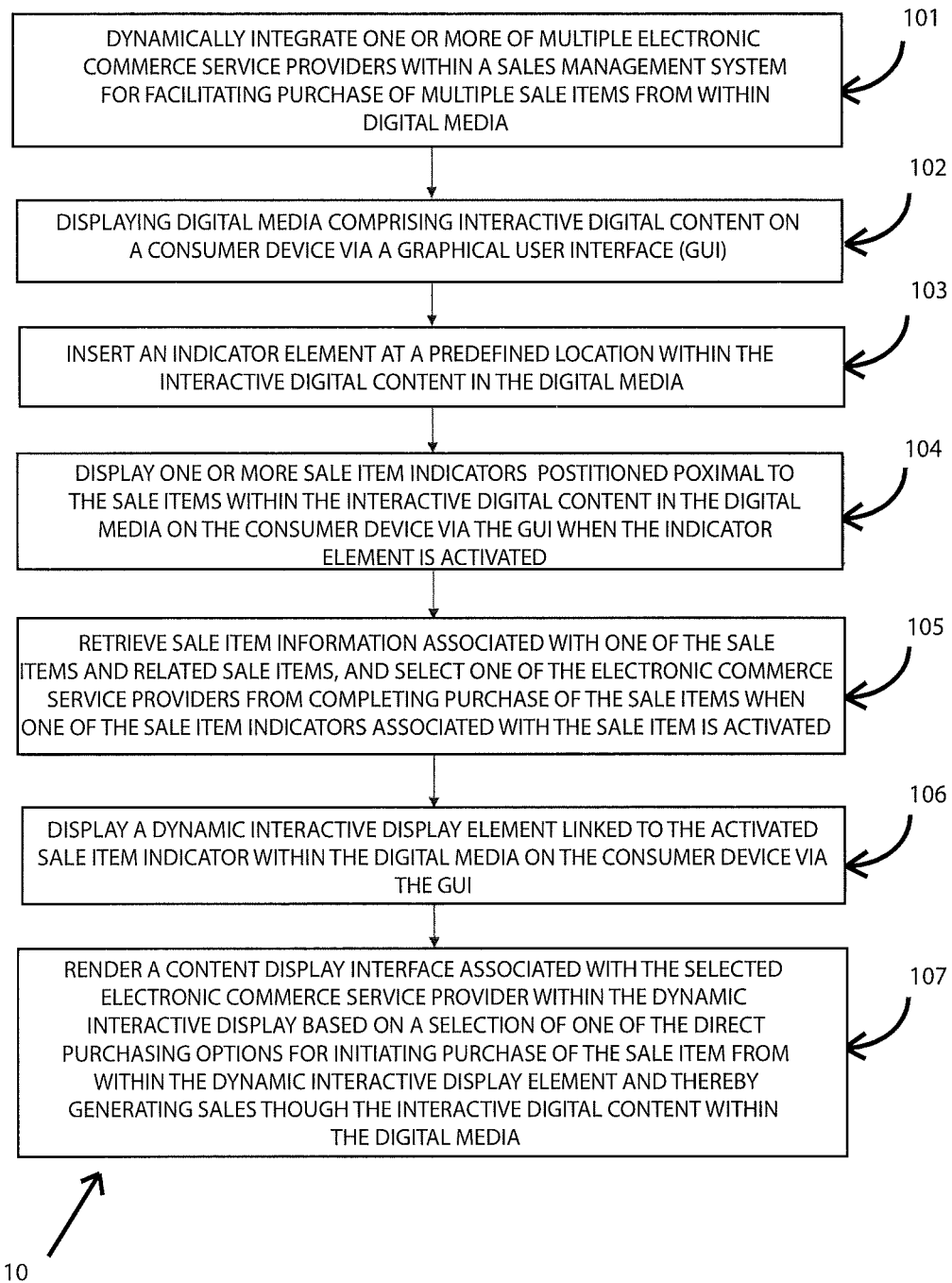
FIG. 3 illustrates a computer implemented method for generating sales through interactive digital content within the digital media.

With the above-described system 10, the method of the invention may be performed, wherein FIG. 3 generally shows the steps of the inventive method by which an improved purchasing process can be achieved.

In method step 101, the computer implemented method disclosed herein dynamically integrates one or more of multiple electronic commerce service providers 23 (FIG. 2) within the sales management system 10 for facilitating purchase of multiple sale items 11 from within the digital media 15 being used by the consumer. The sales management system 10 is used to integrate various sales items 11 of the electronic commerce service provider 23 which can then be integrated into the interactive digital content 19 of the digital media 15.

In method step 102, sales management system 10 displays the digital media 15 comprising the interactive digital content 19 on the consumer device 12 (FIG. 2) via the GUI 14 provided by the sales management system 10. An example of the display of digital media 15 is exemplarily illustrated in FIG. 1A above. The consumer device 12 is an electronic device, for example, a personal computer, a tablet computing device, a mobile computer, a mobile phone, a smart phone, a portable computing device, a laptop, a personal digital assistant, a touch centric device, a workstation, a client device, a portable electronic device, a network enabled computing device, an interactive network enabled communication device, a web browser, any other suitable computing equipment, and combinations of multiple pieces of computing equipment, etc. The consumer device 12 may also be a hybrid device that combines the functionality of multiple devices, for example, a portable device that receives email, supports mobile telephone calls, has music player functionality, and supports web browsing. When displayed, the interactive digital content 19 promotes sale items 11 that are available for purchase from within the digital media 15, and markets such sale items 11 to consumers through the consumer device 12 being operated or viewed by the consumer. In addition to promoting the sale item 11 itself, each sale item 11 is mapped to one or more related sale items 21 provided by the electronic commerce service provider 23, wherein the related sales items 21 are also marketed to the consumer.

The interactive digital content 19 may show various sales items 11 therein which can be viewed by the consumer. To allow the consumer to identify what sales items 11 are present within the interactive digital content 19 being displayed on the consumer device 12, the sales management system 10 preferably inserts, in step 103, an indicator element 18 at a predefined location within the interactive digital content 19 in the digital media 15. As used herein, "indicator element" refers to an element, for example, an icon or a button that is visible to the consumer, and indicates the presence of an interactive object such as a sale item indicator 17. Generally, each sale item indicator 17 in turn may be activated to reveal hidden content when activated. The indicator element 18 is also shown and described relative to FIGS. 1A and 1B.

When the indicator element 18 is activated by the consumer, the indicator element 18 invokes a display of one or more sale item indicators 17 in step 104. An exemplary sale item indicator 17 is seen in FIGS. 1A and 1B. When a consumer clicks on the indicator element 18, the sales management system 10 activates the indicator element 18, wherein in method step 104, the sales management system 10 displays one or more sale item indicators 17 which are positioned proximal to the sale items 11 contained within the interactive digital content 19 in the digital media 15 on the consumer device via the GUI 14 when the indicator element 18 is activated. Each sale item indicator 17 is associated with at least one sale item 11 that is available for purchase from within the interactive digital content 19 in the digital media 15 on the consumer device 12. A single sale item indicator 17 may be associated with a group or collection of sales items 11. When the consumer clicks on one of the sale item indicators 17, the sales management system 10 receives the consumer selection and activates that particular sale item indicator 17 within the interactive digital content 19 in the digital media 15 via the GUI 14. In one example, digital advertising might include one or more sales items 11 which may be viewed in the advertising. The advertising preferably would include an indicator element 18 at a predefined location, and when the consumer clicks on the indicator element 18, one or more sale item indicators 17 would then be displayed next to respective sale items 11 and be viewable by the consumer. If a particular sale item 11 interested the consumer, the consumer might then activate the respective sale item indicator 17 which would display the hidden content associated therewith.

In step 105, when a particular sales item indicator 17 is activated, the sales management system 10 retrieves sale item information associated with the sale item 11 or multiple sales items 11 and selects one of the electronic commerce service providers 23 for completing the purchase of any desired sale item 11. The sale item information comprises sale item details, inventory information, and related sale items 21. Like the description above relative to FIG. 1B, the sale item details comprises a sale item name, a sale item size, a sale item description, a recommended use of the sale item, images, related videos, related reviews, and materials used in construction and/or manufacturing of the sale item 11. The inventory information comprises a color option, a sizing option, and a quantity option. The sales management system 10 retrieves the sale item information associated with the sale item 11 and selects one of the electronic commerce service providers 23 by performing multiple actions. The sales management system 10 first retrieves a sale item identifier, for example, a sale item identity of the sale item, a seller or vendor identifier, and vendor configuration settings comprising electronic commerce service provider details such as an electronic commerce service provider identifier, which can be provided by the vendor. As used herein, "vendor identifier" refers to a unique name or label used to identify a vendor on the sales management system 10. The sales management system 10 then determines one of the electronic commerce service providers 23 for completing the purchase of the sale item 11 based on the retrieved vendor configuration settings, the retrieved sale item identifier, and the retrieved vendor identifier. The sales management system 10 further retrieves related sale items 21 and sale item details associated with the sale item 11 and related sale items 21 based on the retrieved sale item identifier, which information can be retrieved from server based storage or an electronic commerce service provider 23. The sales management system 10 also retrieves inventory information related to the sale item 11 or related sale item 21 from the determined electronic commerce service provider 23.

In the next step 106, the sales management system 10 displays a dynamic interactive display element 24 linked to the activated sale item indicator 17 within the digital media 15 on the consumer device via the GUI 14. FIG. 1B illustrates an example of the dynamic interactive display element 24. As used herein, "dynamic interactive display element" refers to an interactive pop-up window, for example, a dynamic lightbox 24 that expands to provide a display interface for showcasing the sale item information and related information. The dynamic interactive display element 24 displays the retrieved sale item information and provides purchasing options for facilitating purchase of the sale item 11. The dynamic lightbox 24 displays key elements to enhance the consumers' experience and knowledge of the sale item 11 as exemplarily illustrated in FIG. 1B. The dynamic interactive display element 24 displays an images section, a detailed sale item information section, a sale item reviews section, a sale item related videos section, a related sale items section, and a purchasing details and options section. The images section presents high-resolution images with zoom capabilities that provide enlarged views of the sale item 11 providing in depth look and feel of the featured sale item. The detailed sale item information section provides a detailed description about the sale item 11, recommended uses of the sale item 11, and the materials used in the construction of the sale item 11. The sale item reviews section provides reviews written by other consumers who have purchased the sale item 11 and hence allows the consumer to feel more confident about the sale item 11 they are viewing, thereby increasing the odds of purchase. The above elements of sale item details are also made available for any selected related sale items 21 in the format presented for sale items.

The sale item related videos section presents the sale item 11 in a real life environment. The video allows vendors to display how the sale items 11 perform. The related sale items section, also referred herein as the "complete the look section" allows vendors to expose multiple related sale items 21 determined by the vendors that relate to or enhance the success of the advertised sale item 11. The purchasing details and options section reveals the color, sizing, and quantity options for each of the sale items. The purchasing options comprise an indirect purchase option, for example, an "add to" wish list option and a direct purchase option, for example, a buy now option. The buy now option allows the consumer to instantly purchase the advertised sale item or sale items 11 or related sale item or related sale items 21 without leaving the dynamic interactive display element 24. The "add to" wish list option allows the consumer to add the sale items 11 to a shopping cart 41 for purchase at a later time. The shopping cart 41 functions as a cart and as a wish list.

In an embodiment, the sales management system 10 logs and validates a consumer request for viewing the sale item information prior to rendering the sale item information within the dynamic interactive display element 24. For example, whenever a consumer or the digital media application 50 requests for a sale item detail by activating the sales item indicator 17 then the sales management server 51 validates the request before rendering the sale item related details. Also, every request is logged into the sales management system 10 for auditing.

In step 107, the sales management system 10 renders a content display interface associated with the selected electronic commerce service provider 23 within the dynamic interactive display element 24 based on a selection of one of the purchasing options for initiating purchase of the sale item 11 or related sale item 21 from within the dynamic interactive display element 24 and thereby generating sales through interactive digital content 19 within the digital media 15. The content display interface is a graphical user interface, for example, a web page of a website, an online web interface, a web based downloadable application interface, a mobile based downloadable application interface, etc.

In an embodiment, the sales management system 10 integrates multiple social networking applications within the dynamic interactive display element 24, to promote the sale items 11 or related sale items 21 and share sale item information. This feature allows social network sharing from within the application. To share an article or product information, the consumer adds their social application accounts with the consumer device 12, such as a mobile device, wherein the accounts are added in an accounts section provided under device settings. Social media connectivity provides consumers the ability or tools to promote guerilla advertising of sale items 11 about which they are passionate about to other members of targeted consumer groups. Examples of social networking applications comprise, for example, blogs such as Slogger, LiveJournal® of Primordial Soup Ltd., Open Diary, TypePad® of Six Apart Ltd., WordPress® of WordPress Foundation, Vox® and VOXopolis® of Voxopolis Inc., ExpressionEngine® of PMachine, Inc., Xanga® of Xanga.com, Inc.; micro-blogging and presence applications comprising, for example, Twitter® of Twitter, Inc., Plurk, Tumblr.® of Tumblr, Inc., Jaiku of Google, Inc., Fmylife®; social networking such as Bebo® of Bebo, Inc., Facebook® of Facebook, Inc., Linkedin® of Linkedin Corporation, MySpace® of MySpace Inc., Orkut® of Google, Inc., Skyrock®, Hi5® of Hi5 Networks, Inc., Ning® of Ning, Inc., Elgg and social network aggregation applications such as NutshellMail, FriendFeed® of Facebook, Inc., etc.

The method of FIG. 3 is further illustrated and explained relative to remaining FIGS. 4-9. These following figures and the descriptions thereof further discuss the concepts and terminology used with respect to FIGS. 1-3.

Figure 4:
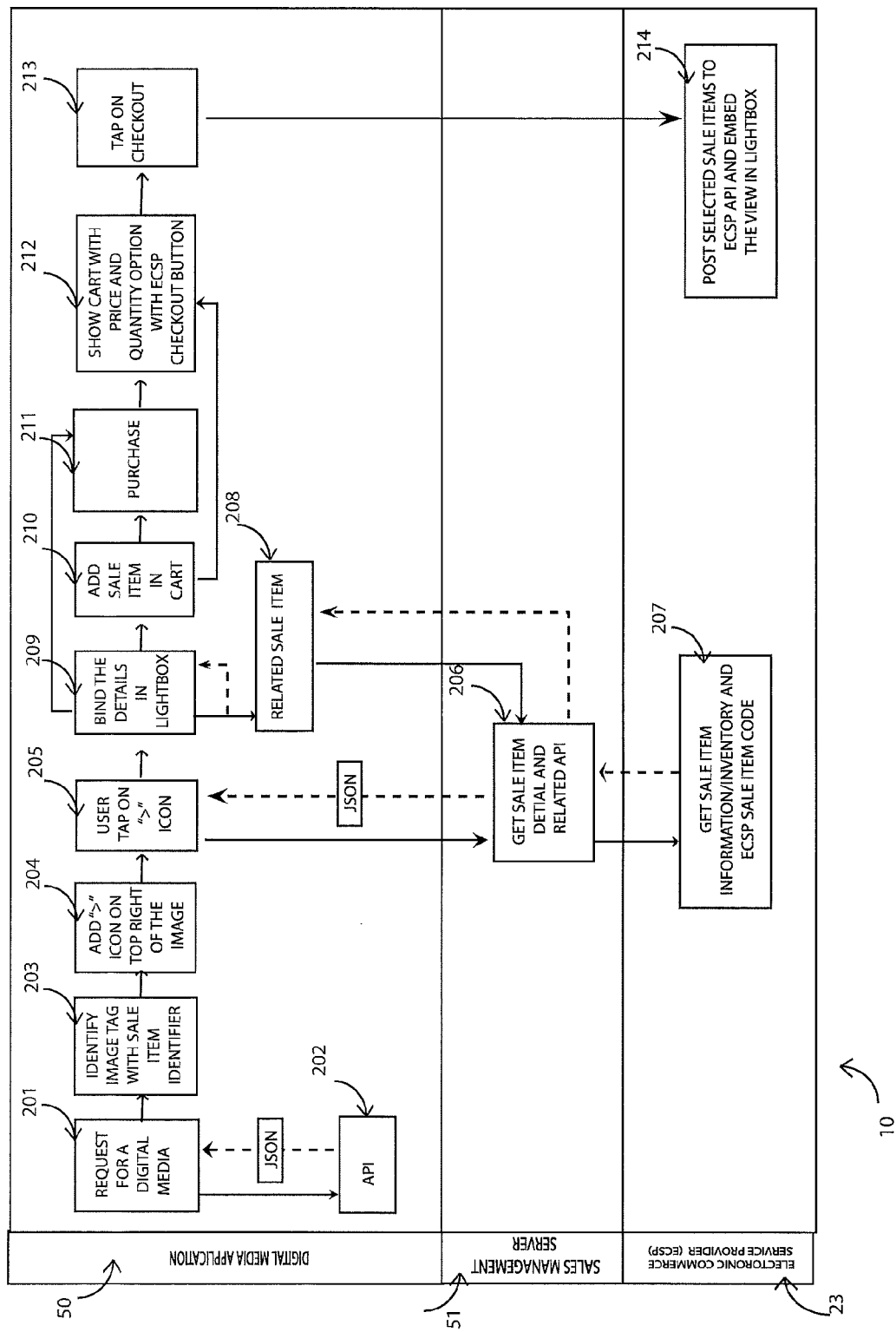
FIG. 4 exemplarily illustrates a process flow diagram comprising the steps performed by a sales management system for generating sales through interactive digital content within digital media.

More particularly, FIG. 4 exemplarily illustrates a process flow diagram comprising the steps performed by the sales management system 10 for generating sales through the interactive digital content 19 within the digital media 15. The sales management system 10 comprises the digital media application 50 in operative communication with the sales management server 51 via the network 52. The digital media application 50 is configured as a software application downloadable on the consumer device 12 such as through the network 52. The digital media application 50 displays multiple presentations of digital media 15, for example, digital magazine articles on the consumer device 12 via the graphical user interface (GUI) 14 as disclosed in the detailed description of FIGS. 1A-1D. The digital media application 50 provides vendors the ability to directly advertise multiple related sale items 21 or sale items 11 to targeted consumer groups via the interactive digital content 19 within the digital media 15, at a time when the consumer is more likely to purchase. For example referring to FIG. 4, when a consumer initiates a request 201 for digital media 15 such as a digital article through the digital media application 50, the digital media application 50 retrieves the requested digital media 15 by deploying an application programming interface (API) 202 that utilizes the JavaScript® object notation (JSON) data interchange format of Sun Microsystems, Inc. The digital media application 50 then displays the retrieved digital media 15 on the GUI 14 of the consumer device 12. The digital media application 50 embeds the interactive digital content 19, for example, an image within the retrieved digital media 15 along with an indicator element 18 that indicates the existence of a sale item 11 such as a product displayed in the image that is available for purchase from within the digital media 15. The digital media application 50 allows the consumer to click on the advertised sale item 11 in the image within the digital article as described above relative to FIGS. 1A-1B. The indicator element 18 is also disclosed in more detail in the following description and figures.

When the indicator element 18 (FIGS. 1A and 1B) is activated, the digital media application identifies 203 a tag of the interactive digital content 19, for example, an image tag of the image with the sale item identifier and adds 204 a ">" icon 17 (FIG. 1A) on the top left side of the sale item 11 in the image or the interactive digital content 19 as seen in FIG. 1A. When the consumer taps 205 on the ">" icon 17, the digital media application 50 gets or retrieves 206 the sale item 11 and sale item detail from the sales management server 51 by deploying another application programming interface (API). The digital media application 50 further interacts with an electronic commerce service provider 23 such as Amazon® or eBay® to get or retrieve 207 sale item information or, at a minimum, inventory information and electronic service provider's sale item code(s). The digital media application binds 209 the retrieved details, that is, the retrieved sale item details, the inventory information, and the related sale items 21 in the dynamic interactive display element 24, for example, a dynamic lightbox for displaying the retrieved details as seen in FIG. 1B. The digital media application 50 displays the complete sale item information to the consumer.

The dynamic interactive display element 24 further provides purchasing options for purchasing the sale items as disclosed in the detailed description of FIGS. 1A-1D. When the consumer clicks on a purchasing option within the dynamic interactive display element 24, the digital media application 50 adds 210 the sale item 11 or related sale item 21 to a shopping cart 41 (FIG. 1C) provided by the digital media application 50 for facilitating purchase 211 of the sale item 11 or related sale item 21. The digital media application 50 displays or shows 212 the shopping cart 41 with the price and the quantity option along with a checkout button 48 that directs the consumer to the third party 54, which typically is the appropriate electronic commerce service provider 23. The digital media application 50 allows the consumer to increase the quantity of the sale item 11 or related sale item 21, i.e. the selected sale item 42, in the shopping cart by selecting the quantity option. The digital media application 50 automatically updates the quantity of the sale item 11 or related sale item 21 in the shopping cart 41. When the consumer taps 213 on the checkout button 48 to purchase the sale item 11 or related sale item 21, the digital media application 50 posts 214 the selected sale items to the electronic commerce service provider 23 by deploying a third party API and embeds the view in the dynamic interactive display element 24. For example, if the electronic commerce service provider 23 is Amazon®, then the dynamic interactive display element 24 displays the Amazon® website 49 (FIG. 1D) within the digital media 15 and the consumer can purchase the sale item 11 or related sale item 21 using an Amazon® shopping cart. Once the consumer purchases the sale item 11 or related sale item 21, the digital media application 50 removes the sale item 11 or related sale item 21 from the shopping cart 41. The consumer can track his/her order from the Amazon® website 49. In this manner, a purchase of the sales items 11 or related sale item 21 can be completed with minimal interruption to the consumer.

Figure 5:
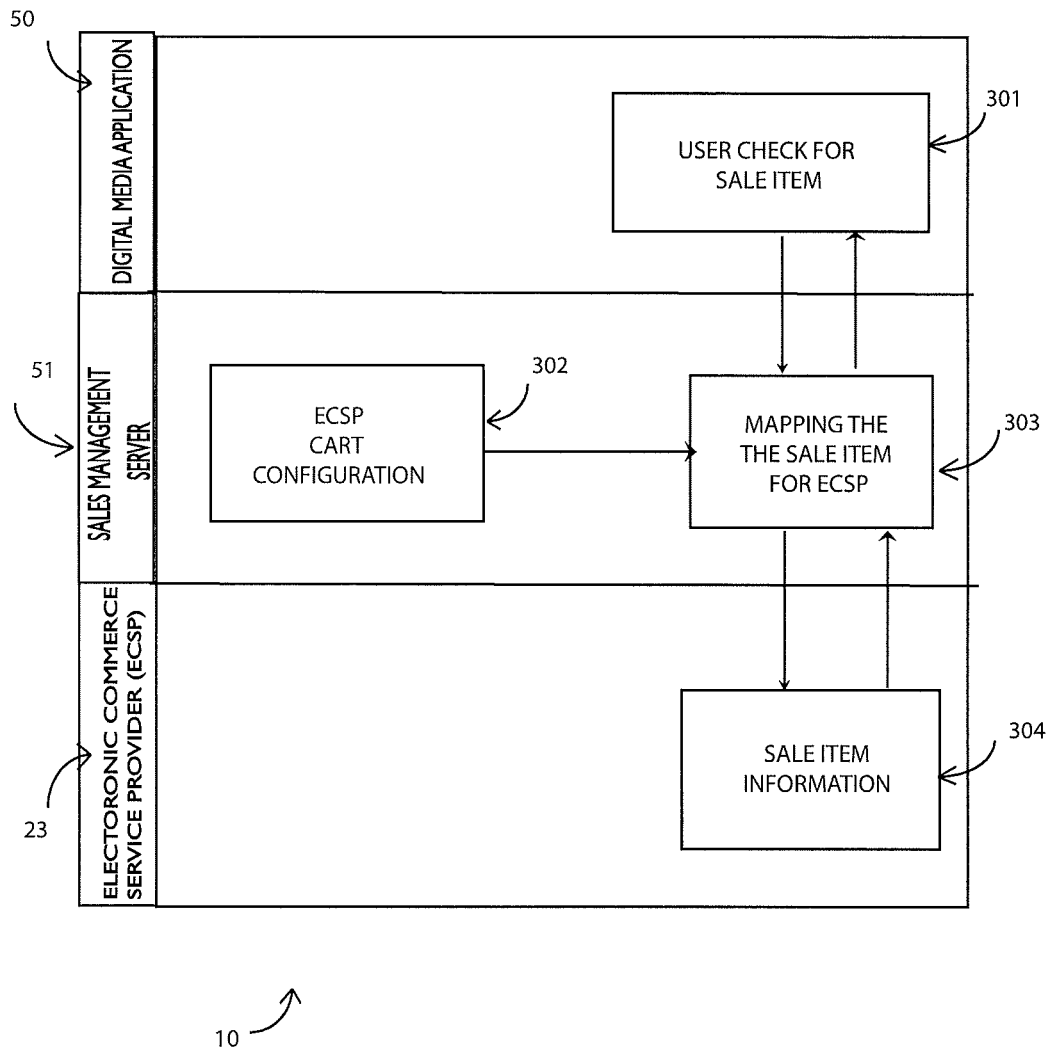
FIG. 5 exemplarily illustrates a process flow diagram comprising the steps performed by the sales management system for retrieving sale item information and selecting an electronic commerce service provider.

FIG. 5 exemplarily illustrates a process flow diagram comprising the steps performed by the sales management system 10 for retrieving sale item information and selecting an electronic commerce service provider 23 (FIG. 2). FIG. 5 exemplarily illustrates the interactions between the different modules of the sales management system 10. The sales management system 10 supports the integration of multiple third-party or electronic commerce service provider shopping carts for checkout. For example, few vendors such as content providers and/or publishers may use Amazon® store as their shopping cart but some of the vendors prefer to use eBay®. The sales management system 10 provides the option to target the appropriate third party or electronic commerce service provider shopping cart based on the vendor configuration settings. When a consumer checks 301 a sale item or product 11 or related sale item 21, the digital media application 50 of the sales management system 10 receives the consumer request for sale item information on the sale item 11 or related sale item 21 and passes the request to the sales management server 51 for retrieving the sale item information.

Before rendering the sale item information, the sales management server 51 verifies 302 the electronic commerce service provider cart configuration settings to determine the appropriate shopping cart that is to be used during checkout. Since each sale item is potentially mapped 303 to multiple related sale items 21 exemplarily illustrated in FIGS. 1A-1D, provided by the electronic commerce service provider 23, the sales management server 51 identifies the appropriate electronic commerce service provider identifier to fetch the inventory information. The entire sale item details are retrieved either from the sales management server 51 or from the electronic commerce service provider 23 at the same time. The sales management server 51 sends a request to the determined electronic commerce service provider 23 to fetch the inventory details. The sales management server 51 then merges the inventory details to the sale item details to obtain the sale item information 304 and renders the final output to the digital media application 50.

Figure 6:
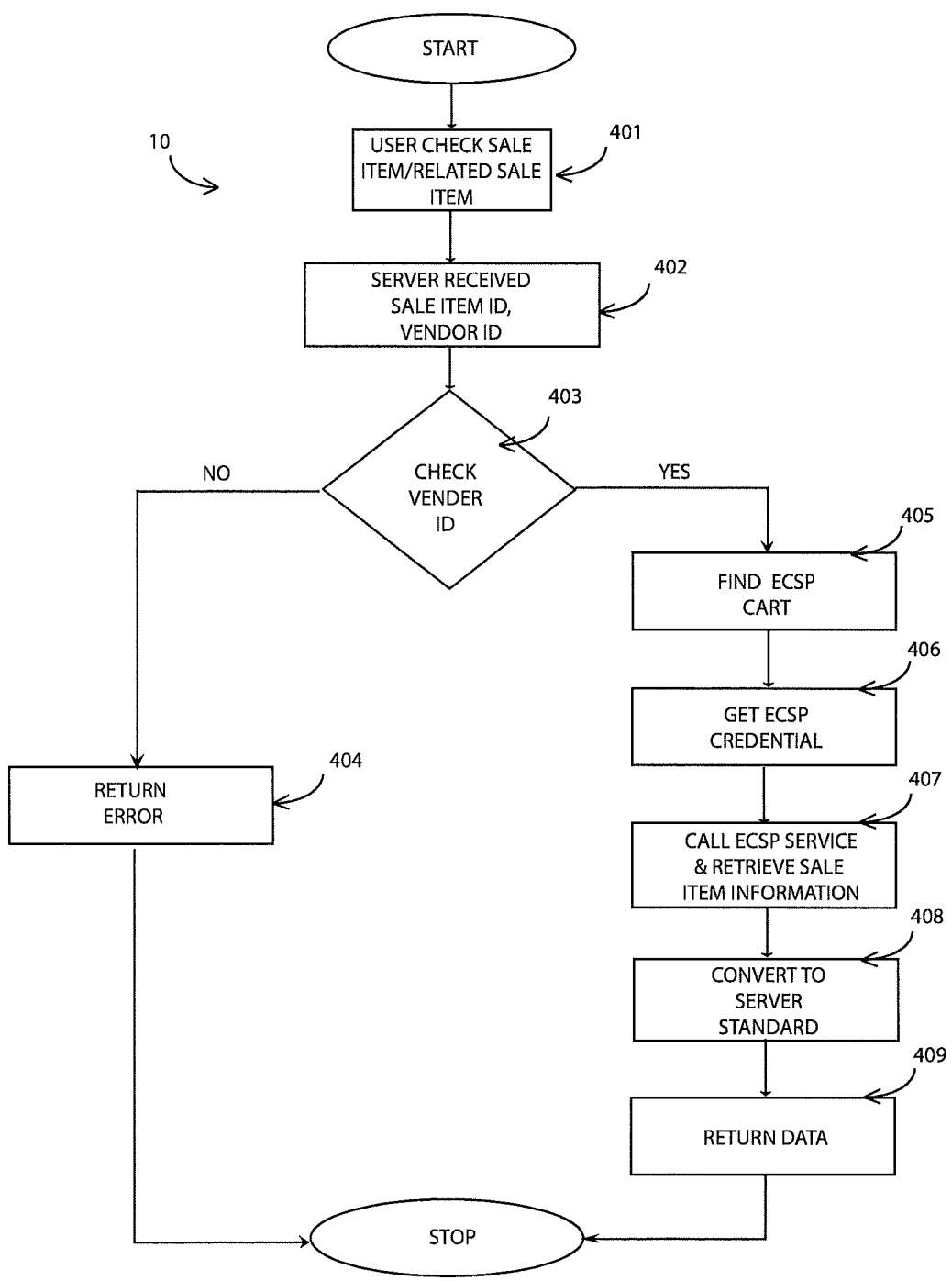
FIG. 6 exemplarily illustrates a flowchart comprising the steps performed by the sales management system for retrieving sale item information and selecting an electronic commerce service provider.

Next, FIG. 6 exemplarily illustrates a flowchart comprising the steps performed by the sales management system 10 for retrieving sale item information and selecting an electronic commerce service provider 23. When a consumer checks 401 a sale item 11 and requests sale item information for the sale item 11 which is tagged within the interactive digital content 19 in the digital media 15, the sales management server 51 of the sales management system 10 retrieves or receives 402 a sale item identifier and a vendor identifier associated with the sale item. The sales management server 51 then checks or verifies 403 the validity of the vendor identifier. For example, the sales management server 51 verifies if the vendor identifier exists and if the vendor identifier is a valid identifier. If the vendor identifier is not a valid identifier then the sales management server 51 returns 404 an error message. If the vendor identifier is a valid identifier then the sales management server 51 determines or finds 405 the electronic commerce service provider 23 associated with the vendor identifier. The sales management server 51 then retrieves 406 the electronic commerce service provider's credentials from the vendor identifier for determining the appropriate shopping cart that is to be used during checkout. The electronic commerce service provider credentials or vendor configuration settings comprise, for example, a sale item identifier, an electronic commerce service provider identifier, and security keys. The sales management server 51 utilizes the electronic commerce service provider credentials to call 407 the electronic commerce service provider to get sale item information or product inventory details. The sales management server 51 converts 408 all the retrieved sale item information into a format that is recognized by the digital media application 50 and returns 409 the retrieved sale item information to the digital media application 50.

Figure 7:
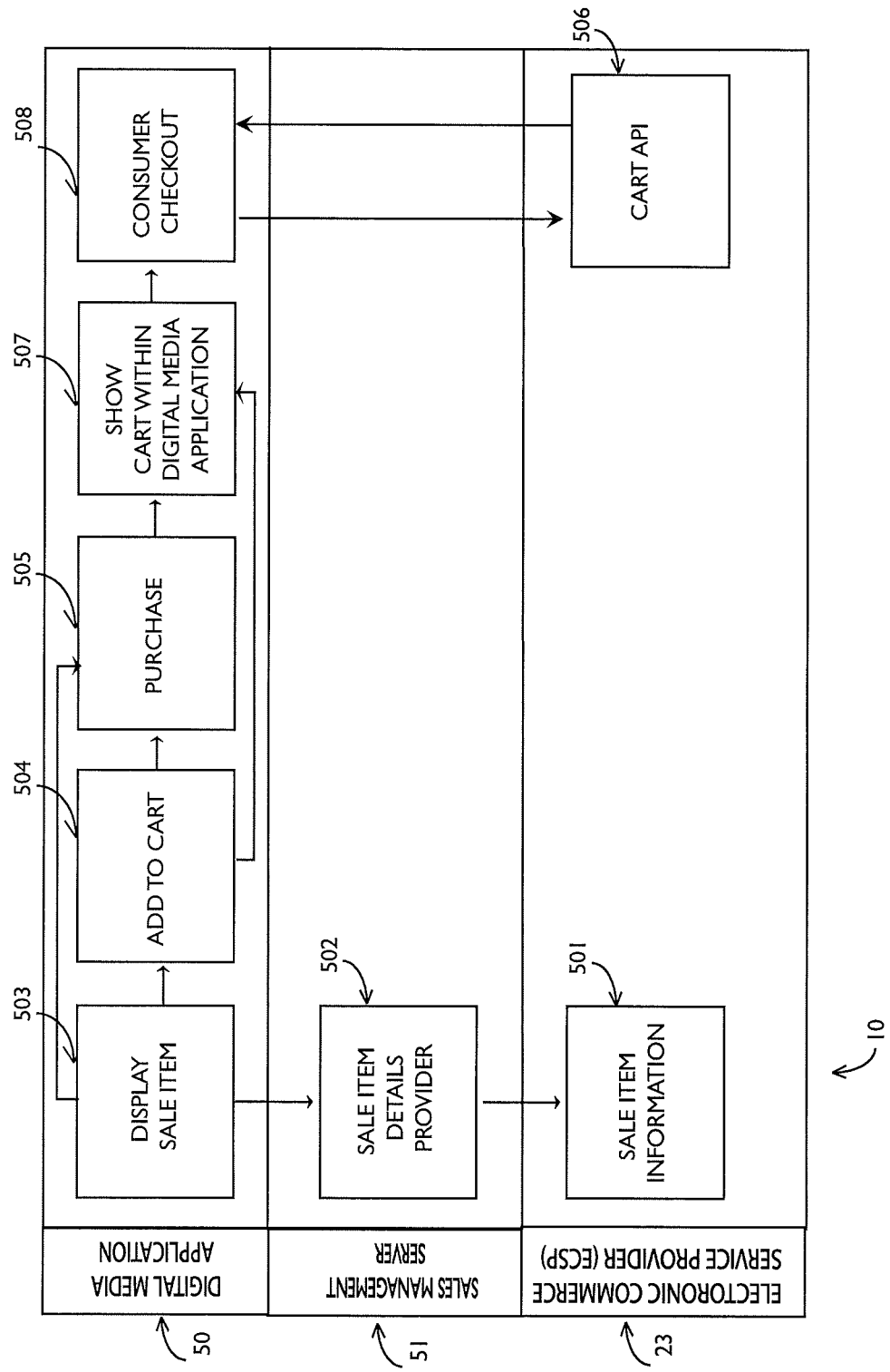
FIG. 7 exemplarily illustrates a process flow diagram comprising the steps performed by the sales management system for coordinating purchase of the sale item from within the digital media.

Still further, FIG. 7 exemplarily illustrates a process flow diagram comprising the steps performed by the sales management system 10 for coordinating purchase of the sale item 11 or related sale item 21 from within the digital media 15. When a consumer clicks on a sale item 11 displayed in an interactive digital content 19 within the digital media 15, the digital media application 50 requests for sale item information and electronic commerce service provider details from the sales management server 51. The sales management server 51 sends the request to the electronic commerce service provider 23. The electronic commerce service provider 23 receives the request from the sales management server 51 and sends a response to the sales management server 51 based on the sale item identifier, security keys, security tokens, etc., used for authentication. The sales management server 51 retrieves 501 the sale item information or, at a minimum, the inventory detail from the electronic commerce service provider 23 and provides 502 the retrieved information to the digital media application 50 as sale item information. The digital media application 50 displays 503 the sale item information on the consumer device 12 via the GUI 14.

Figure 1D:
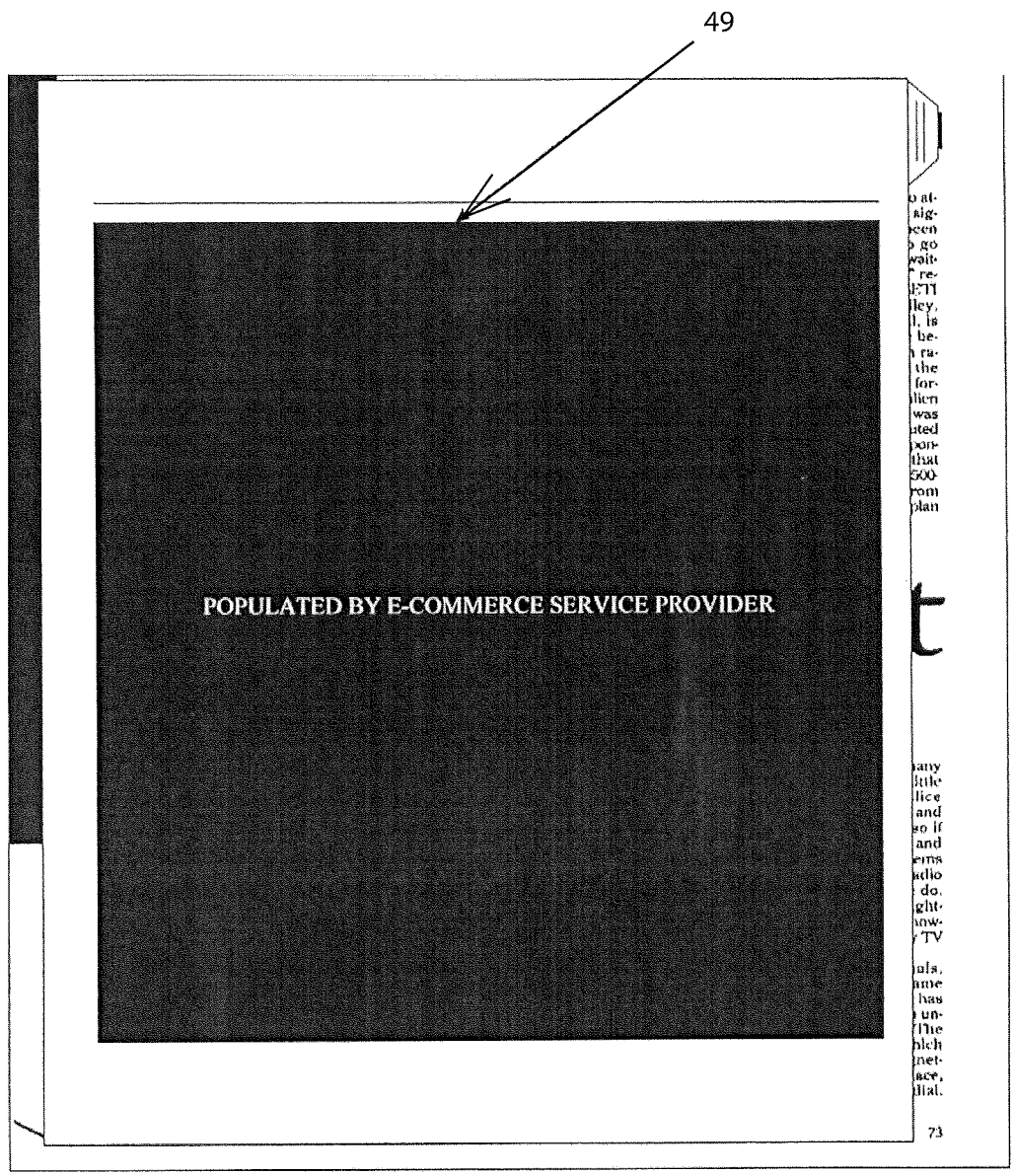
FIG. 1D illustrates a further screenshot after a consumer has a clicked a checkout button in the shopping cart and accesses a website for an electronic commerce service provider.

The digital media application 50 provides an inbuilt shopping cart 41 that allows a consumer to add one or more sale items 11 or related sale items 21 that the consumer wants to purchase. The digital media application 50 adds 504 the selected sale items 11 or related sale items 21 to the shopping cart 41. The shopping cart 41 can be used to maintain more than one sale item 11 or related sale item 21. The shopping cart 41 provides a checkout or purchase button 48. When the consumer clicks 505 on the purchase button 48, the digital media application 50 deploys 506 a cart application programming interface (API) and sends a cart API request to the electronic commerce service provider 23. The cart API adds the sale items 11 or related sale items 21 in the shopping cart 41 and returns the details. The digital media application 50 transfers the sale items 11 or related sale items 21 to the electronic commerce service provider cart and embeds the electronic commerce service provider cart in the dynamic interactive display element 24 within the digital media 15 for example as seen in FIG. 1D. The dynamic interactive display element 24 loads or shows 507 the shopping cart along with the selected sale items 11 or related sale items 21. The consumer can then complete the checkout 508 process from within the digital media 15. When the consumer clicks on the checkout button, the digital media application 50 allows the consumer to purchase the sale items 11 or related sale items 21 without moving out or navigating away from the digital media 15.

Figure 8:
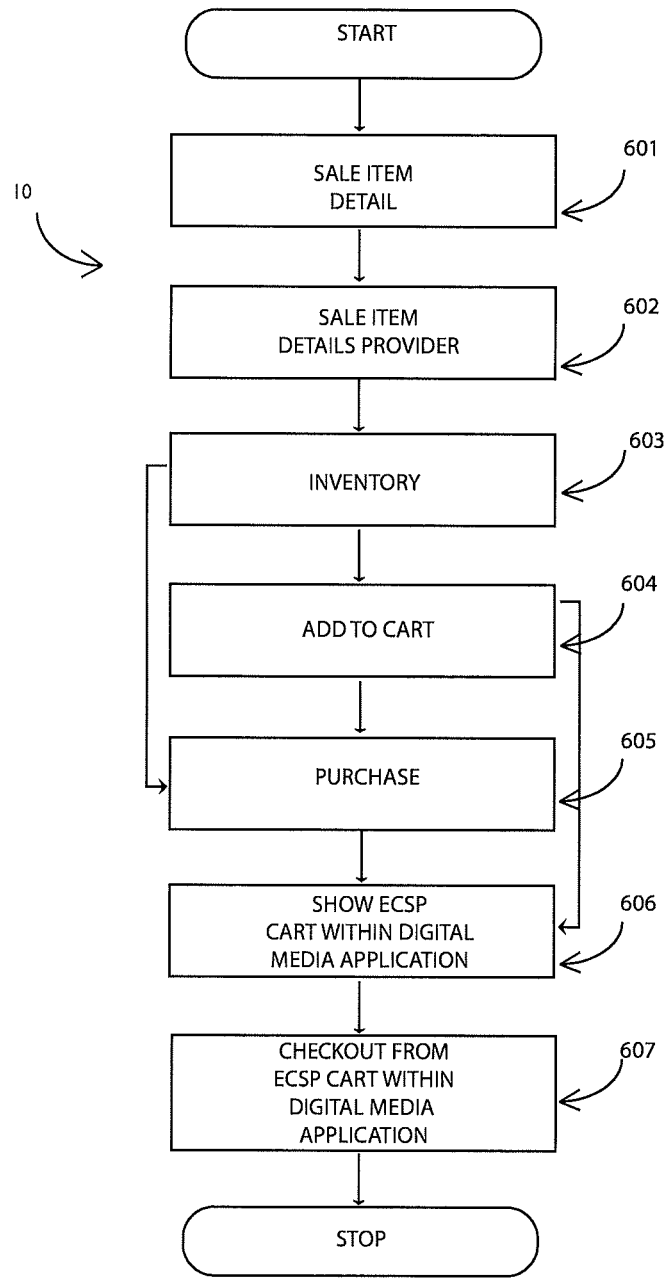
FIG. 8 exemplarily illustrates a flowchart comprising the steps performed by the sales management system for coordinating purchase of the sale item from within the digital media.

In more detail, FIG. 8 exemplarily illustrates a flowchart comprising the steps performed by the sales management system 10 for coordinating purchase of the sale item 11 or related sale item 21 from within the digital media 15. When a consumer initiates a request 601 for sale item detail of a sale item 11 or related sale item 21, the digital media application 50 retrieves 602 the sale item details of the sale item 11, and picture details from the sales management server 51 by using a sale item identifier or product identifier. The sales management server 51 sends a request to the electronic commerce service provider 23 to fetch 603 sale item information or, at a minimum, inventory details depending on the vendor identifier or publisher identifier, the sale item identifier, and electronic commerce service provider identifier. The sale item details and the inventory information are merged and a final output is returned to the digital media application 50. When the consumer adds 604 the sale item to the shopping cart and selects 605 the purchase option, the digital media application 50 transfers the selected sale items or the selected related sales items to the electronic commerce service provider cart and displays 606 the website of the electronic commerce service provider within the dynamic interactive display element in the digital media 15. The digital media application 50 then facilitates checkout 607 of the sale items 11 or related sale item 21 from the electronic commerce service provider cart.

Figure 9:
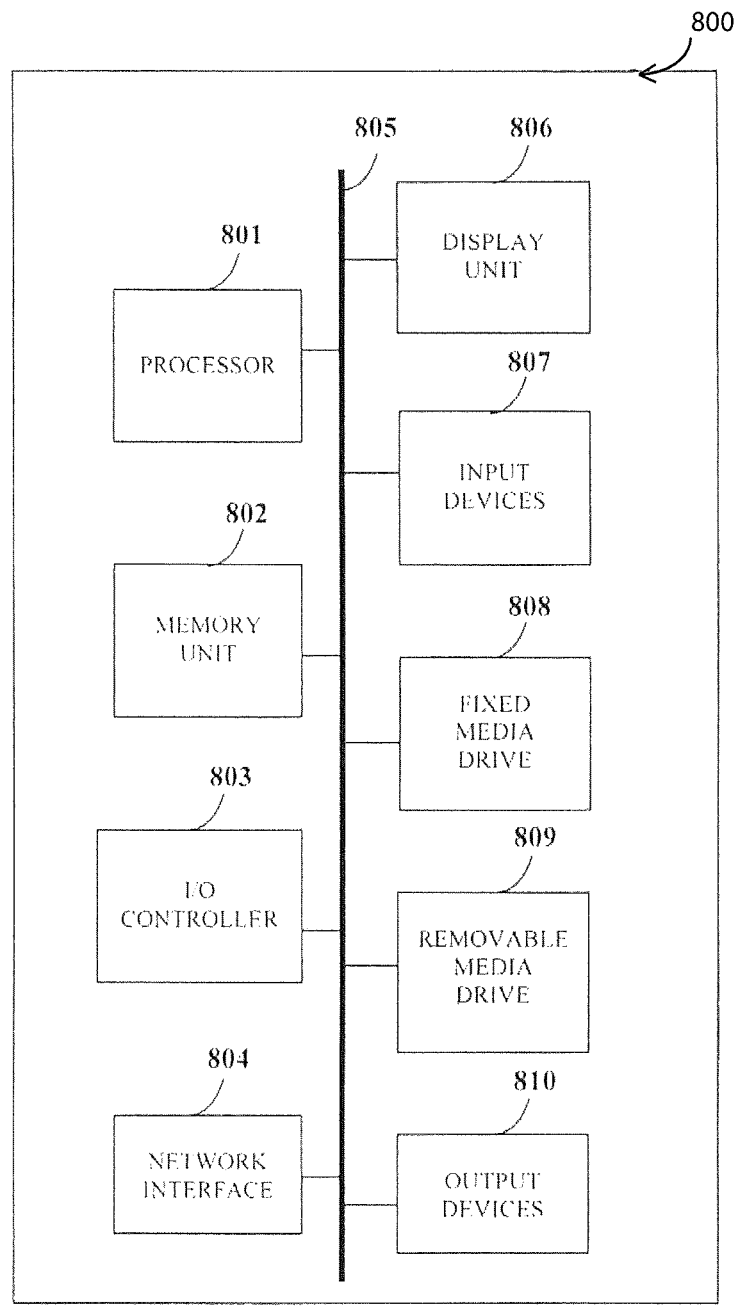
FIG. 9 exemplarily illustrates the architecture of a computer system employed by the sales management system for generating sales through interactive digital content within digital media.

FIG. 9 exemplarily illustrates the architecture of a computer system 800 employed by the sales management system 10 exemplarily illustrated in FIG. 2, for generating sales through the interactive digital content 19 within the digital media 15. The digital media application 50 and the sales management server 51 of the sales management system 10 exemplarily illustrated in FIG. 2, each employ the architecture of the computer system 800 exemplarily illustrated in FIG. 9. The computer system 800 is programmable using a high level computer programming language. The computer system 800 may be implemented using programmed and purposeful hardware. The digital media application 50 preferably is configured as a software application downloadable on the consumer device 12 of a consumer, for example, a buyer via a network 52, for example, a short range network or a long range network. The digital media application 50 communicates with the sales management server 51 via the network 52.

The computer system 800 comprises, for example, a processor 801, a non-transitory computer readable storage medium such as a memory unit 802 for storing programs and data, an input/output (I/O) controller 803, a network interface 804, a data bus 805, a display unit 806, input devices 807, a fixed media drive 808, a removable media drive 809 for receiving removable media, output devices 810, etc. The processor 801 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 801 may also be implemented as a processor set comprising, for example, a general purpose microprocessor and a math or graphics coprocessor. The processor 801 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The digital media application 50 and the sales management server 51 of the sales management system 10 disclosed herein are not limited to a computer system 800 employing a processor 801. The computer system 800 may also employ a controller or a microcontroller. Referring to FIGS. 2 and 9, the processor 801 of the consumer device 12 executes the modules (FIG. 2), for example, 50*a*, 50*b*, etc., of the digital media application 50, and the processor 801 of the sales management server 51 executes the modules, for example, 51*a*, 51*b*, etc., of the sales management server 51.

The memory unit 802 is used for storing programs, applications, and data. For example with reference to FIG. 2, the media display module 50*a*, the indicator management module 50*b*, etc.; of the digital media application 50 are stored in the memory unit 802 of the consumer device 12. In another example, the dynamic integration module 51*a* and the information retrieval module 51*b* of the sales management server 51 are stored in the memory unit 802 of the sales management server 51. The memory unit 802 is, for example, a random access memory (RAM) or another type of dynamic storage device that stores information and instructions for execution by the processor 801. The memory unit 802 also stores temporary variables and other intermediate information used during execution of the instructions by the processor 801. The computer system 800 further comprises a read only memory (ROM) or another type of static storage device that stores static information and instructions for the processor 801. The I/O controller 803 controls input actions and output actions performed by the digital media application 50.

The network interface 804 enables connection of the computer system 800 to the network 52. For example, the digital media application 50 connects to the network 52 exemplarily illustrated in FIG. 2, via the network interface 804 of the consumer device 12. In another example, the sales management server 51 connects to the network 52 via the network interface 804 of the sales management server 51. In an embodiment, the network interface 804 is provided as an interface card also referred to as a line card. The network interface 804 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 805 of the consumer device 12 permits communications between the modules, for example, 50*a*, 50*b*, etc., of the digital media application 50. The data bus 805 of the sales management server 51 permits communications between the modules, for example, 51*a*, 51*b*, etc., of the sales management server 51.

The display unit 806, via the graphical user interface (GUI) 14, displays information, display interfaces, consumer interface elements such as text fields, checkboxes, text boxes, windows, etc., for allowing viewing of the digital media 15 and sale item information associated with the sale item 11 or related sale item 21. The display unit 806 comprises, for example, a liquid crystal display, a plasma display, an organic light emitting diode (OLED) based display, etc. The input devices 807 are used for inputting data into the computer system 800. The consumer uses the input devices 807 to provide inputs to the digital media application 50. For example, a consumer may select one of the purchasing options to purchase the sale item using the input devices 807. The input devices 807 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 800. The programs are loaded onto the fixed media drive 808 and into the memory unit 802 of the computer system 800 via the removable media drive 809. In an embodiment, the computer applications and programs may be loaded directly via the network 52. Computer applications and programs are executed by double clicking a related icon displayed on the display unit 806 using one of the input devices 807. The output devices 810 output the results of operations performed by the digital media application 50 and the sales management server 51. For example, the digital media application 50 provides detailed sale item information to consumers using the output devices 810. The digital media application 50 displays the sale item information using the output devices 810.

The processor 801 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. The computer system 800 employs the operating system for performing multiple tasks. The operating system is responsible for management and coordination of activities and sharing of resources of the computer system 800. The operating system further manages security of the computer system 800, peripheral devices connected to the computer system 800, and network connections. The operating system employed on the computer system 800 recognizes, for example, inputs provided by the consumers using one of the input devices 807, the output display, files, and directories stored locally on the fixed media drive 808, for example, a hard drive. The operating system on the computer system 800 executes different programs using the processor 801. The processor 801 and the operating system together define a computer platform for which application programs in high level programming languages are written.

The processor 801 of the computer system 800 employed by the digital media application 50 retrieves instructions defined by the media display module 50a, the indicator management module 50b, etc., of the digital media application 50 for performing respective functions disclosed in the detailed description of FIG. 7. The processor 801 of the computer system 800 employed by the sales management server 51 retrieves instructions defined by the dynamic integration module 51a, the information retrieval module 51b, etc., for performing respective functions disclosed in the detailed description of FIG. 7. The processor 801 retrieves instructions for executing the modules, for example, 50a, 50b, etc., of the digital media application 50 and the modules, for example, 51a, 51b, etc., of the sales management server 51 from the respective memory units 802. A program counter determines the location of the instructions in the memory unit 802. The program counter stores a number that identifies the current position in the program of each of the modules, for example, 50a, 50b, etc., of the digital media application 50, and the modules, for example, 51a, 51b, etc., of the sales management server 51. The instructions fetched by the processor 801 from the memory unit 802 after being processed are decoded. The instructions are stored in an instruction register in the processor 801. After processing and decoding, the processor 801 executes the instructions, thereby performing one or more processes defined by those instructions.

At the time of execution, the instructions stored in the instruction register are examined to determine the operations to be performed. The processor 801 then performs the specified operations. The operations comprise arithmetic operations and logic operations. The operating system performs multiple routines for performing a number of tasks required to assign the input devices 807, the output devices 810, and memory for execution of the modules, for example, 50a, 50b, etc., of the digital media application 50 and the modules, for example, 51a, 51b, etc., of the sales management server 51. The tasks performed by the operating system comprise, for example, assigning memory to the modules, for example, 50a, 50b, etc., of the digital media application 50 and the modules, for example, 51a, 51b, etc., of the sales management server 51, and to data used by the digital media application 50 and the sales management server 51, moving data between the memory unit 802 and disk units, and handling input/output operations. The operating system performs the tasks on request by the operations and after performing the tasks, the operating system transfers the execution control back to the processor 801. The processor 801 continues the execution to obtain one or more outputs. The outputs of the execution of the modules, for example, 50a, 50b, etc., of the digital media application 50 and the modules, for example, 51a, 51b, etc., of the sales management server 51 are displayed to the consumer on the display unit 806.

For purposes of illustration, the detailed description refers to the digital media application 50 being run locally on the consumer device 12 operating the computer system 800; however the scope of the computer implemented method and the sales management system 10 disclosed herein is not limited to the digital media application 50 being run locally on the consumer device 12 via the operating system and the processor 801, but may be extended to run remotely over the network 52 by employing a web browser and a remote server, a mobile phone, or other electronic devices. One or more portions of the computer system 800 may be distributed across one or more computer systems (not shown) coupled to the network 52.

The above-described computer system 800 therefore is provided so as to operate a computer program product. The following provides further disclosure as to the computer program product which comprises a non-transitory computer readable storage medium that stores computer program codes comprising instructions executable by at least one processor 801 for generating sales through the interactive digital content 19 within the digital media 15.

The computer program product comprises a first computer program code for dynamically integrating one or more of multiple electronic commerce service providers 23 within the sales management system 10 for facilitating purchase of multiple sale items 11 from within digital media 15; a second computer program code for displaying the digital media 15 comprising interactive digital content 19 on a consumer device 12 via a GUI 14; a third computer program code for inserting an indicator element 18 at a predefined location within the interactive digital content 19 in the digital media 15 if desired; a fourth computer program code for displaying one or more sale item indicators 17 positioned proximal to the sale items 11 within the interactive digital content 19 in the digital media 15 on the consumer device 12 via the GUI 14 when the indicator element 18 is activated or even continuously if the indicator element 18 is eliminated; a fifth computer program code for retrieving sale item information or, at a minimum, inventory detail associated with one of the sale items 11 or related sale items 21, and selecting one of the electronic commerce service providers 23 for completing the purchase of the sale item 11; a sixth computer program code for displaying a dynamic interactive display element 24 linked to the activated sale item indicator 17 within the digital media 15 on the consumer device 12 via the GUI 14; and a seventh computer program code for rendering a content display interface associated with the selected electronic commerce service provider 23 within the dynamic interactive display element 24 based on a selection of one of the direct purchasing options for initiating purchase of the sale item 11 or related sale items 21 from within the dynamic interactive display element 24 and thereby generating sales through the interactive digital content 19 within the digital media 15.

The fifth computer code further comprises an eighth computer program code for retrieving a sale item identifier of the sale item 11 or related sale items 21, a vendor identifier, and vendor configuration settings; a ninth computer program code for determining one of the electronic commerce service providers 23 for completing purchase of the sale item 11 based on the retrieved vendor configuration settings, the retrieved sale item identifier, and the retrieved vendor identifier; a tenth computer program code for retrieving related sale items 21 exemplarily illustrated in FIG. 1B, and sale item information associated with the related sale item 21 based on the retrieved sale item identifier; and an eleventh computer program code for logging and validating a consumer request for viewing the sale item information prior to rendering the sale item information within the dynamic interactive display element 24. The computer program product disclosed herein further comprises one or more additional computer program codes for performing additional steps that may be required and contemplated for generating sales through the interactive digital content 19 within the digital media 15. In an embodiment, a single piece of computer program code comprising computer executable instructions performs one or more steps of the computer implemented method disclosed herein for generating sales through interactive digital content 19 within digital media 15.

The computer program codes comprising computer executable instructions are embodied on the non-transitory computer readable storage medium. The processor 801 of the computer system 800 retrieves these computer executable instructions and executes them. When the computer executable instructions are executed by the processor 801, the computer executable instructions cause the processor 801 to perform the steps of the computer implemented method for generating sales through interactive digital content 19 within digital media 15. The above-described methods and system 10 provide an improved system for facilitating purchases of sales items 11 including related sales items 21.

In operation, the particular presentation of the digital media 15 can vary and depend upon many factors. In this regard, FIGS. 1A-1D illustrate sample screenshots of the graphical user interface (GUI) 14 provided by the digital media application 50 of the sales management system 10, for generating sales through the interactive digital content 19 within the digital media 15. The screenshot of the GUI 14 of FIG. 1A shows the digital media application 50 displaying the digital media 15, for example, as a digital magazine which includes a digital article on skiing. The article might be a general discussion of skiing or some other topic and as such, is not necessarily presented to the consumer as an obvious advertisement. However, it will be understood that the photo of the skier could also be part of an advertisement or catalog without departing from the present invention. In any case, the digital media 15 comprises the interactive digital content 19, which includes one or more sale items 11 that can be viewed by a potential consumer. The digital media application 50 of the sales management system 10 disclosed herein enhances sales success of digital magazine articles advertisements by facilitating purchase of the sale item 11 from within the digital magazine. The sales management system 10 may display various sale items 11 through the digital media application 50, as well as the related sale items 21, which vendors believe are appropriate.

In accord with the above discussion of FIGS. 1A and 1B, the digital media application 50 embeds the indicator element 18 in the GUI 14, which on activation by the consumer invokes the display of a sale item indicator 17 positioned proximal to the sales item 11. The consumer will recognize that the indicator element 18 essentially indicates that sales items 11 are present with the digital media 15. When a consumer becomes interested and activates the "P" icon 18, the digital media application 50 displays the sale item indicator 17 next to the helmet 11, which indicates that the helmet 11 is purchasable from within the digital media application 50. In an alternate form of the invention, the indicator element 18 might be omitted while the sales item indicators 17 are displayed continuously or possibly by passing over a sales item 11 with a cursor or the like. As described above relative to FIG. 1B, when the consumer activates the sale item indicator 17, the digital media application 50 retrieves related sale items 21 and sale item details associated with the sales item 11 using a sale item identifier, the vendor identifier, and the vendor configuration settings. The digital media application 50 determines an electronic commerce service provider 23 for completing the purchase based on the retrieved information. The digital media application 50 further retrieves sale item information or, at a minimum, inventory information.

More particularly as to FIG. 1B, when the sales item indicator 17 is activated, the digital media application 50 displays the dynamic interactive digital element 24 (FIG. 1B) that displays the retrieved sale item information. All the related sale items 21 are displayed at the bottom of the dynamic lightbox 24 as thumbnails. When the consumer clicks on one of the related sale items 21 displayed in the related sale item boxes 36 of the related sale items section 40, the digital media application 50 provides detailed information about the selected related sale item 21. If the consumer clicks on the add to cart button 34, then the digital media application 50 adds the sales item 11 or related sale item 21 to the shopping cart 41 as seen in FIG. 1C. The digital media application 50 provides the toolbar 43 that provides shortcut links to frequently used controls. When the consumer clicks on the shopping cart icon or shopping bag icon on the toolbar 43, the digital media application 50 displays the shopping cart 41 within the dynamic interactive digital element or dynamic lightbox 24 showing all the selected sale items 11 or related sale items 21 added to the shopping cart 41 (FIG. 1C). If the consumer decides to proceed and purchase the helmet 11 by clicking on the purchase button 35, the digital media application 50 routes to electronic commerce service provider 23 such as Amazon® as exemplarily illustrated in FIG. 1D.

Preferably as seen in FIG. 1C, the shopping cart 41 displays the sale items 11 and related sale items 21, and the digital media application 50 allows the consumer to edit size and quantity of each sale item 11 or related sale item 21 in the shopping cart 41 and select one or more items for immediate purchase. The digital media application 50 automatically updates the shopping cart 41 based on the consumer selections of the sale items 11, the quantity option, and the size option. The shopping cart 41 also provides the checkout button 48 that allows the consumer to checkout the selected sale items 11, or related sale items 21, and redirects the consumer to the electronic commerce service provider 23 (FIG. 1D). The provider web site 49 is loaded in the dynamic lightbox 24 within the digital media and the consumer can continue the purchase through the electronic commerce service provider web site.

It will be readily apparent that the various methods, algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise Pro C, C#, JavaScript®, CSS, HTML, MS SQL Server, SQL Lite, and Microsoft®.NET etc. Other object-oriented, functional, scripting, and/or logical programming languages may also be used. The computer program codes or software programs may be stored on or in one or more mediums as object code. Various aspects of the method and system disclosed herein may be implemented as programmed elements, or non-programmed elements, or any suitable combination thereof. The computer program product disclosed herein comprises one or more computer program codes for implementing the processes of various embodiments.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for generating sales through interactive digital content within digital media, said method employing a sales management system comprising at least one processor configured to execute computer program instructions for performing said method, said method comprising:

dynamically integrating one or more of a plurality of electronic commerce service providers within said sales management system for facilitating purchase of a plurality of sale items from within said digital media;

displaying said digital media comprising said interactive digital content on a consumer device via a graphical user interface provided by said sales management system, wherein said interactive digital content is configured to promote said sale items that are available for said purchase from within said digital media, and wherein each of said sale items is mapped to one or more related sale items;

inserting an indicator element at a predefined location within said interactive digital content in said digital media by said sales management system, wherein said indicator element is configured to invoke a display of a plurality of sale item indicators;

displaying one or more of said sale item indicators positioned proximal to said sale items within said interactive digital content in said digital media on said consumer device via said graphical user interface when said indicator element is activated, wherein each of said one or more of said sale item indicators is associated with one of said sale items that is available for said purchase from within said interactive digital content in said digital media on said consumer device;

retrieving sale item information associated with said one of said sale items or related sale items, and selecting one of said electronic commerce service providers for completing said purchase of said one of said sale items or related sale items, by said sales management system when one of said one or more of said sale item indicators associated with said one of said sale items is activated within said interactive digital content in said digital media via said graphical user interface;

displaying a dynamic interactive display element linked to said one of said activated one of said one or more of said sale item indicators within said digital media on said consumer device via said graphical user interface, wherein said dynamic interactive display element is configured to display said retrieved sale item information and provide purchasing options for facilitating said purchase of said one of said sale items or related sale items; and rendering a content display interface associated with said selected one of said electronic commerce service providers within said dynamic interactive display element by said sales management system based on a selection of one of said purchasing options for initiating purchase of said one of said sale items from within said dynamic interactive display element and thereby generating said sales through said interactive digital content within said digital media.

2. The computer implemented method of claim 1, wherein said sales management system is configured to retrieve said sale item information associated with said one of said sale items or related sale items, and select said one of said electronic commerce service providers by performing a plurality of actions comprising:

retrieving a sale item identifier of said one of said sale items, a vendor identifier, and vendor configuration settings comprising electronic commerce service provider details;

determining said one of said electronic commerce service providers for completing said purchase of said one of said sale items based on said retrieved vendor configuration settings, said retrieved sale item identifier, and said retrieved vendor identifier;

retrieving related sale items and sale item details associated with said one of said sale items based on said retrieved sale item identifier; and retrieving sale item information or, at a minimum, inventory information related to said one of said sale items or related sale items from said determined one of said electronic commerce service providers.

3. The computer implemented method of claim 1, wherein said sale item information comprises sale item details, inventory information, and information on said related sale items.

4. The computer implemented method of claim 3, wherein said sale item details comprises a sale item name, a sale item size, a sale item description, a recommended use of said one of said sale items, images, related videos, related reviews, and materials used in one of construction and manufacturing of said one of said sale items.

5. The computer implemented method of claim 3, wherein said inventory information comprises a color option, a sizing option, and a quantity option.

6. The computer implemented method of claim 1, wherein said purchasing options comprise an indirect purchase option and a direct purchase option.

7. The computer implemented method of claim 1, further comprising integrating a plurality of social networking applications within said dynamic interactive display element by said sales management system to promote said sale items and share said sale item information.

8. The computer implemented method of claim 1, further comprising logging and validating a consumer request for viewing said sale item information by said sales management system prior to rendering said sale item information within said dynamic interactive display element.

9. The computer implemented method of claim 1, wherein said digital media comprises digital magazines, digital articles, digital newspapers, digital videos, digital images, electronic books, and video games.

10. The computer implemented method of claim 1, wherein said interactive digital content comprises digital advertisements.

11. A sales management system for generating sales through interactive digital content within digital media, said sales management system comprising:

a non-transitory computer readable storage medium configured to store computer program instructions defined by modules of said sales management system;

at least one processor communicatively coupled to said non-transitory computer readable storage medium, said at least one processor configured to execute said defined computer program instructions;

a dynamic integration module configured to dynamically integrate one or more of a plurality of electronic commerce service providers within said sales management system for facilitating purchase of a plurality of sale items from within said digital media;

a media display module configured to display said digital media comprising said interactive digital content on a consumer device via a graphical user interface, wherein said interactive digital content is configured to promote said sale items that are available for said purchase from within said digital media, and wherein each of said sale items is mapped to one or more related sale items provided by said one or more of said electronic commerce service providers;
an indicator management module configured to insert an indicator element at a predefined location within said interactive digital content in said digital media, wherein said indicator element is configured to invoke a display of a plurality of sale item indicators;
said indicator management module configured to display one or more of said sale item indicators positioned proximal to said sale items within said interactive digital content in said digital media on said consumer device via said graphical user interface when said indicator element is activated, wherein each of said one or more of said sale item indicators is associated with one of said sale items that is available for said purchase from within said interactive digital content in said digital media on said consumer device;
an information retrieval module configured to retrieve sale item information associated with said one of said sale items, and select one of said electronic commerce service providers for completing said purchase of said one of said sale items or related sale items, when one of said one or more of said sale item indicators associated with said one of said sale items is activated within said interactive digital content in said digital media via said graphical user interface;
said media display module further configured to display a dynamic interactive display element linked to said one of said activated one of said one or more of said sale item indicators within said digital media on said consumer device via said graphical user interface, wherein said dynamic interactive display element is configured to display said retrieved sale item information and provide purchasing options for facilitating said purchase of said one of said sale items; and
said media display module further configured to render a content display interface associated with said selected one of said electronic commerce service providers within said dynamic interactive display element based on a selection of one of said purchasing options for initiating purchase of said one of said sale items from within said dynamic interactive display element and thereby generating said sales through said interactive digital content within said digital media.

12. The sales management system of claim 11, wherein said information retrieval module is configured to retrieve said sale item information associated with said one of said sale items or related sale items, and select said one of said electronic commerce service providers by performing a plurality of actions comprising:
retrieving a sale item identifier of said one of said sale items, a vendor identifier, and vendor configuration settings comprising electronic commerce service provider details;
determining said one of said electronic commerce service providers for completing said purchase of said one of said sale items or related sale items based on said retrieved vendor configuration settings, said retrieved sale item identifier, and said retrieved vendor identifier;
retrieving related sale items and sale item details associated with said one of said sale items based on said retrieved sale item identifier; and
retrieving sale item information or, at a minimum, inventory information related to said one of said sale items or related sale items from said determined one of said electronic commerce service providers.

13. The sales management system of claim 11, wherein said sale item information comprises sale item details, inventory information, and information on said related sale items.

14. The sales management system of claim 13, wherein said sale item details comprises a sale item name, a sale item size, a sale item description, a recommended use of said one of said sale items, images, related videos, related reviews, and materials used in one of construction and manufacturing of said one of said sale items.

15. The sales management system of claim 13, wherein said inventory information comprises a color option, a sizing option, and a quantity option.

16. The sales management system of claim 11, wherein said purchasing options comprise an indirect purchase option and a direct purchase option.

17. The sales management system of claim 11, wherein said dynamic integration module is further configured to integrate a plurality of social networking applications within said dynamic interactive display element to promote said sale items.

18. The sales management system of claim 11, wherein said information retrieval module is further configured to log and validate a consumer request for viewing said sale item information prior to rendering said sale item information within said dynamic interactive display element.

19. The sales management system of claim 11, wherein said digital media comprises digital magazines, digital articles, digital newspapers, digital videos, digital images, electronic books, and video games.

20. The sales management system of claim 11, wherein said interactive digital content comprises digital advertisements.

21. A computer program product comprising a non-transitory computer readable storage medium, said non-transitory computer readable storage medium storing computer program codes that comprise instructions executable by at least one processor, said computer program codes comprising:
a first computer program code for dynamically integrating one or more of a plurality of electronic commerce service providers within a sales management system for facilitating purchase of a plurality of sale items from within digital media;
a second computer program code for displaying said digital media comprising interactive digital content on a consumer device via a graphical user interface, wherein said interactive digital content is configured to promote said sale items that are available for purchase from within said digital media, and wherein each of said sale items is mapped to one or more related sale items;
a third computer program code for inserting an indicator element at a predefined location within said interactive digital content in said digital media, wherein said indicator element is configured to invoke a display of a plurality of sale item indicators;
a fourth computer program code for displaying one or more of said sale item indicators positioned proximal to said sale items within said interactive digital content in said digital media on said consumer device via said graphical user interface when said indicator element is activated, wherein each of said one or more of said sale item indicators is associated with one of said sale items that is available for said purchase from within said interactive digital content in said digital media on said consumer device;
a fifth computer program code for retrieving sale item information associated with said one of said sale items or related sale items, and selecting one of said electronic commerce service providers for completing said purchase of said one of said sale items or related sale items, when one of said one or more of said sale item indicators associated with said one of said sale items is activated within said interactive digital content in said digital media via said graphical user interface;

a sixth computer program code for displaying a dynamic interactive display element linked to said one of said activated one of said one or more of said sale item indicators within said digital media on said consumer device via said graphical user interface, wherein said dynamic interactive display element is configured to display said retrieved sale item information and provide purchasing options for facilitating said purchase of said one of said sale items; and a seventh computer program code for rendering a content display interface associated with said selected one of said electronic commerce service providers within said dynamic interactive display element based on a selection of one of said purchasing options for initiating purchase of said one of said sale items or related sale items from within said dynamic interactive display element and thereby generating said sales through said interactive digital content within said digital media.

22. The computer program product of claim 21, wherein said fifth computer program code further comprises:

an eighth computer program code for retrieving a sale item identifier of said one of said sale items, a vendor identifier, and vendor configuration settings comprising electronic commerce service provider details;

a ninth computer program code for determining said one of said electronic commerce service providers for completing said purchase of said one of said sale items or related sale items based on said retrieved vendor configuration settings, said retrieved sale item identifier, and said retrieved vendor identifier;

a tenth computer program code for retrieving related sale items and sale item information associated with said one of said sale items, or each said related sale item based on said retrieved sale item identifier.

23. The computer program product of claim 21, wherein said computer program codes further comprise an eleventh computer program code for logging and validating a consumer request for viewing said sale item details prior to rendering said sale item information within said dynamic interactive display element.

* * * * *